United States Patent
Takeyama et al.

(10) Patent No.: US 7,990,608 B2
(45) Date of Patent: Aug. 2, 2011

(54) OPTICAL TRANSMISSION SYSTEM

(75) Inventors: Tomoaki Takeyama, Kawasaki (JP);
Keiko Sasaki, Kawasaki (JP);
Shinichirou Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 443 days.

(21) Appl. No.: 11/845,335

(22) Filed: Aug. 27, 2007

(65) Prior Publication Data
US 2008/0074731 A1    Mar. 27, 2008

(30) Foreign Application Priority Data
Sep. 26, 2006 (JP) .................. 2006-260376

(51) Int. Cl.
*H04B 10/17* (2006.01)
*H04B 10/12* (2006.01)

(52) U.S. Cl. .......... 359/337.12; 359/337.11; 359/337.4; 359/341.41

(58) Field of Classification Search ............. 359/337.11, 359/337.12, 337.4, 341.41
See application file for complete search history.

(56) References Cited

U.S. PATENT DOCUMENTS

| | | | |
|---|---|---|---|
| 5,436,760 A | 7/1995 | Nakabayashi | 359/341 |
| 6,157,481 A * | 12/2000 | Sugaya et al. | 359/337 |
| 6,347,008 B1 * | 2/2002 | Vodhanel | 359/337.4 |
| 6,359,726 B1 * | 3/2002 | Onaka et al. | 359/337.1 |
| 6,441,955 B1 * | 8/2002 | Takatsu et al. | 359/341.4 |
| 7,359,112 B2 * | 4/2008 | Nishihara et al. | 359/341.41 |
| 2002/0067538 A1 * | 6/2002 | Sugaya et al. | 359/337.12 |
| 2002/0075562 A1 * | 6/2002 | Youn et al. | 359/341.41 |
| 2003/0231379 A1 * | 12/2003 | Komaki et al. | 359/337.4 |
| 2004/0027651 A1 * | 2/2004 | Balland et al. | 359/341.41 |
| 2005/0146782 A1 * | 7/2005 | Takeyama et al. | 359/337.1 |
| 2006/0050751 A1 * | 3/2006 | Sakamoto | 372/32 |
| 2008/0080865 A1 * | 4/2008 | Muro et al. | 398/83 |

FOREIGN PATENT DOCUMENTS

| | | |
|---|---|---|
| JP | 7-28105 | 1/1995 |
| JP | 09219696 A * | 8/1997 |
| JP | 10-150414 | 6/1998 |
| JP | 2000-252923 | 9/2000 |

(Continued)

OTHER PUBLICATIONS

T. Aizawa, et al., "Effect on Spectral-Hole Burning on Multi-Channel EDFA Gain Profile", Optical Fiber Communication Conference and the International Conference on Integrated Optics and Optical Fiber Communication (OFC '99), WG1, pp. 102-104, Feb. 24, 1999.

(Continued)

*Primary Examiner* — Eric Bolda
(74) *Attorney, Agent, or Firm* — Staas & Halsey LLP

(57) ABSTRACT

An optical amplifier reducing gain deviation caused by wavelength arrangement has a first-stage optical amplifying unit, an attenuator, a second-stage optical amplifying unit, an automatic gain controller controlling the first- and second-stage optical amplifying units so that a gain of signal light outputted from the second-stage optical amplifying unit to signal light inputted to the first-stage optical amplifying unit is constant, and an attenuation amount controller controlling an attenuation amount at the attenuator to adjust gain-versus-wavelength characteristic at the automatic-gain-controlled first- and second-stage optical amplifying units on the basis of information on wavelength arrangement and an input level of the signal light inputted to the first-stage optical amplifying unit so that gain slope characteristic at the first- and second-stage optical amplifying units due to the wavelength arrangement and the input level is flattened.

13 Claims, 15 Drawing Sheets

FOREIGN PATENT DOCUMENTS

JP           3551418           5/2004

OTHER PUBLICATIONS

M. Nishihara, et al., "Characterization and New Numerical Model of Spectral Hole Burning in Broadband Erbium-Doped Fiber Amplifier", Optical Amplifiers and Their Applications, TuD3, pp. 204-206, Jul. 6-9, 2003.

M. Nishihara, et al., "Impact of Spectral Hole Burning in Multi-Channel Amplification of EDFA", Optical Fiber Communication (OFC:04), FB1, Feb. 22-27, 2004.

S. Ono, et al., "Evaluation of the Quenching Effect on Gain Characteristics in Alumino-Silicate Erbium Doped Fiber by Numerical Simulation", Rare Earths '04 in Nara Japan, FO-05, pp. 21, Nov. 7-12, 2004.

S. Ono, et al., "Study of Gain Spectral Hole Burning of Silica-Based EDF at 77K", The $45^{th}$ Workshop on Glass and Photonics, H-3, pp. 80-81, Nov. 25-26, 2004.

S. Ono, "Optical Properties and Gain Characteristics of Erbium-Doped Fiber Amplifier", Thesis Hearing, Kyoto University, Jan. 18, 2005.

S. Ono, et al., "Effect of Erbium Ion Concentration on Gain Spectral Hole Burning in Silica-Based Erbium-Doped Fiber", 2005 Optical Fiber Communication Conference Technical Digest, OThL1, Mar. 6-11, 2005.

* cited by examiner

OPTICAL TRANSMISSION SYSTEM

BACKGROUND OF THE INVENTION

1) Field of the Invention

The present invention relates to an optical amplifier and a method of controlling the optical amplifier. Particularly, the present invention relates to an optical amplifier and a method of controlling the same, which are suited to be used when signal light is amplified in a wavelength division multiplexing (WDM) transmission system.

2) Description of the Related Art

According to the expansion of multi-media networks, the enhancement for communication traffic is a prime task. Therefore, it is much important to utilize WDM transmission systems including optical amplifiers for amplifying and relaying arranged in multiple stage to reduce the cost of the communication systems in the society affected the multi-media networks.

Transmission loss estimated in a WDM transmission system is as very wide as 0 to about 30 dB. When optical amplifiers which compensate transmission losses in a wide range estimated as above are applied to a WDM transmission system, it is general to place many types of optical amplifiers on a menu according to each compensation amount for a transmission loss required at a position where each optical amplifier is applied. However, when many types of optical amplifiers are placed on a menu, there arises a problem of an increase in cost because many types of optical amplifiers have to be in stock and, and a problem of an increase in labor cost and time required to select a type of the optical amplifier. Hence, it is desired to be able to compensate the transmission losses with a small number of types of optical amplifiers.

To meet such demand, the optical amplifier is required to realize three kinds of performance expressed in terms of operation conditions, that is, a constant output power, a flat gain-versus-wavelength characteristic, and a low noise figure (NF), with respect to a wide input dynamic range.

For example, as one of the techniques of WDM transmission systems, including an optical amplifier having a variable optical attenuator (VOA) which is disposed between the front-stage amplifying unit and the rear-stage amplifying unit. Although a person who is not skilled in the art may believe that VOA is unmatched in the amplifiers, such an optical amplifier having VOA is disclosed in Patent Document 1 as below. This configuration is a standard of optical amplifiers in WDM transmission systems. Incidentally, rare-earth-doped optical fibers such as EDFs (Erbium Doped Fibers) are used as the amplifying units in the front and rare stages.

When the optical amplifier is so designed as to provide a predetermined output level Pi, the configuration in which a variable optical attenuator is disposed between the front-stage and the rear-stage optical amplifying units as described in Patent Document 1 can provide the predetermined output signal light level with a wider dynamic range of the input light and an excellent NF by performing the gain constant control, as compared with configurations where (1) the optical amplifier is formed with one optical amplifying unit, (2) a VOA is placed in the rear stage of the optical amplifying unit, and (3) the optical amplifying unit is placed in the rear stage of a VOA.

(1) Namely, when the optical amplifier is configured as a single optical amplifying unit 100 comprising an amplification medium 101 made of an EDF and a pumping source 102 as shown in FIG. 15 (a), it is necessary to decrease the gain in order to keep the output level when the input level changes from #1 to #2 as shown in FIG. 15(b). This is accomplished by changing the pump power. However, this change in gain causes a change in gain-versus-wavelength characteristic, which leads to a change in characteristic of a channel of the WDM signal light.

(2) When an optical amplifier is configured with an optical amplifying unit 100A which has an EDF and a pumping source and is controlled in the automatic gain control (AGC), and a VOA 103 disposed in the rear stage of the optical amplifying unit 100A as shown in FIG. 16(a), a constant gain and a constant gain-versus-wavelength characteristic can be both obtained irrespective of the input level, as shown in FIG. 16(b). However, when the input level is relatively high, it is necessary to raise relatively the pumping light power for the purpose of the automatic gain control and to attenuate the signal light level obtained through the amplification by the VOA 103, which impedes efficient use of the pump power.

(3) When an optical amplifier is configured with a VOA 103 and an optical amplifying unit 100B similar to that (refer to a reference character 100A) shown in FIG. 16(a) disposed in the rear stage of the VOA 103 as shown in FIG. 17(a), the input signal light in a stage before amplification is attenuated, as shown in FIG. 17(b). Therefore, even if the input signal light is amplified by the optical amplifying unit 100B in the rear stage, the NF is degraded.

To the contrary, in a configuration where two optical amplifying units 100A and 100B both controlled in the automatic gain control are arranged tandemly, and a VOA 103 (for the output level constant control) is placed between the optical amplifying units 100A and 100B, it is possible to provide a constant gain-versus-wavelength characteristic by performing the automatic gain control while widening the dynamic range of the input signal level. Further, it is possible to keep an excellent NF while using efficiently the pump power.

In Patent Document 1, the automatic gain control is performed by using the gain characteristics that have gain slopes (inclinations of gain-versus-wavelength characteristic) in directions opposite to each other in the optical amplifying unit in the front stage and the optical amplifying unit in the rear stage, thereby flattening the gain-versus-wavelength characteristic of the signal light amplified by the amplifying unit in the front stage and the amplifying unit in the rear stage.

In an optical amplifier 110 shown in FIG. 19, an automatic gain controller (AGC control unit) 114 performs a control to keep a level ratio of a level of input signal light (Is) inputted to an optical amplifying unit 111 in the front stage to a level of output signal light (Os) outputted from an optical amplifying unit 112 in the rear stage, that is, a gain of the optical amplifier 110. While an attenuation amount controller 115 changes the attenuation amount of a VOA 113 according to an amount of variation in the signal light input level to maintain a predetermined signal light output level while keeping flatness of the output wavelength characteristic. Owing to the control by the automatic gain controller 114 shown in FIG. 19, it is possible to improve the control responsibility with the control circuit for the automatic gain control being shared, as compared with the above-mentioned case where the optical amplifying unit 100A in the front stage and the optical amplifying unit 100B in the rear stage are separately subjected to the automatic gain control as shown in FIG. 18(a).

As above, the known techniques are on the assumption that so long as the optical amplifying units are automatic-gain-controlled, the gain-versus-wavelength characteristic can be kept constant irrespective of arrangement of wavelengths of the input signal light, as shown in FIGS. 18(a) and 19. In other words, when rare-earth-doped optical fiber is used as the amplification medium, the known optical amplifiers flatten the gain on the axis of wavelengths without consideration on an effect of SHB (Spectral Hole Burning) which is a phenomenon that deviation occurs in the gain-versus-wavelength characteristic due to arrangement of wavelengths of the input signal light. Details of the physical phenomenon of SHB are described in Non-Patent Documents 1 through 7, etc., for example.

In more details, in the optical amplifier shown in FIG. 18(a) or 19, a GEQ (Gain Equalizer) is placed in the rear stage of the second-stage optical amplifying unit 100B or 112 to give a loss wavelength characteristic corresponding to the gain-versus-wavelength characteristic controlled constant in the optical amplifier, whereby finally realizing the flatness on the axis of wavelengths of the signal light level.

For example, when WDM signal light having 40 channels (40 wavelengths) and four kinds of WDM signal light at six wavelengths having different wavelength arrangements A, B, C and D are inputted to an EDF, which is one type of rare-earth-doped optical fibers, it can be assumed that they have a uniform gain-versus-wavelength characteristic as shown in FIG. 20(a) if SHB is not taken into consideration. Incidentally, in FIGS. 20(a) through 20(c), the characteristic obtained when the WDM signal light at 40 wavelengths is inputted is shown by "◇," and the characteristics obtained when the four kinds of WDM signal light at six wavelengths are inputted are shown by "□," "Δ," "X" and "*," respectively.

When a GEQ having a wavelength characteristic that cancels the uniform gain wavelength characteristic shown in FIG. 20(a) is inserted behind an EDF which forms the optical amplifying unit 100B or 112 [refer to the loss wavelength characteristic of GEQ shown in FIG. 20(b)], the gain-versus-wavelength characteristic of the output from the GEQ is flattened as a result as shown in FIG. 20(c), irrespective of the wavelength arrangement. Incidentally, techniques that adjust an optical level amplified by an EDFA (EDF Amplifier) as does the above GEQ are described in Patent Documents 2 through 4 below, for example.

[Patent Document 1] Specification of Japanese Patent No. 3551418
[Patent Document 2] Japanese Patent Application Laid-Open No. H10-150414
[Patent Document 3] Japanese Patent Application Laid-Open No. H7-28105
[Patent Document 4] Japanese Patent Application Laid-Open No. 2000-252923
[Non-Patent Document 1] Takuya Aizawa et al. "Effect of Spectral-Hole Burning on Multi-Channel EDFA Gain Profile," In: Proceedings of Conference on Optical Communication 1999 (OFC '99) WG1, P102-104
[Non-Patent Document 2] M. Nishihara, et al., "Characterization and new numerical model of spectral hole burning in broadband erbium-doped fiber amplifier,", OAA2003, TuD3, 2003.
[Non-Patent Document 3] M. Nishihara, et al., "Impact of spectral hole burning in Multi-channel amplification of EDFA," OFC2004, FB1, 2004.
[Non-Patent Document 4] Ono, Tabe, "Evaluation of the Quenching Effect on Gain Characteristics in Aluminum-silicate Erbium Doped Fiber by Numerical Simulation," Rare Earths '04, F0-05, 2004.11.7
[Non-Patent Document 5] Ono, Tabe, Nishihara, Ishikawa, "Gain Spectral Hole Formation Behavior of EDF at low temperature," $45^{th}$ Glass and Photonic Materials Discussion, H-3, 2004.11.25
[Non-Patent Document 6] Ono, "Optical Properties and Gain Characteristics of Erbium-Doped Fiber Amplifier," Public Hearing on Theses for degrees, Kyoto University, 2005
[Non-Patent Document 7] Ono, Tabe, Nishihara, Ishikawa, "Effect of erbium ion concentration on gain spectral hole burning in silica-based erbium-doped fiber," OFC/NFOEC 2005, OThL1, 2005

However, the above known techniques seek flatness of gain on the axis of wavelengths without a consideration on an effect of SHB (Spectral Hole Burning), which is a phenomenon that generates deviation in gain-versus-wavelength characteristic according to wavelength arrangement of inputted signal light. For this reason, the known techniques have an disadvantage that the gain deviation due to a change in amount of generation of SHB due to wavelength arrangement of inputted signal light cannot be solved.

Now, explanation is made of gain deviation occurring when not WDM signal light at 40 wavelengths but four kinds of WDM signal light at six wavelengths A through D in different wavelength arrangements are inputted, for example, with reference to FIGS. 21(a) through 21(c). Incidentally, in FIGS. 21(a) through 21(c), a characteristic obtained when WDM signal light at 40 wavelengths is inputted is shown by "◇," and characteristics obtained when four kinds of WDM signal light at six wavelengths are inputted are shown by "□," "Δ," "X" and "*," respectively.

In the case of the WON signal light at six wavelengths, the gain-versus-wavelength characteristic of the EDF is fluctuated by only a small amount according to the wavelength arrangement due to a change in amount of generation of SHB as compared with the WDM signal light at 40 wavelengths, as shown in FIG. 21(a). Here, it is assumed that the gain-versus-wavelength characteristics are identical irrespective of the wavelength arrangement. Under this assumption, a GEQ is inserted to the rear stage of the EDF [refer to FIG. 21(b)], which GEQ has a wavelength characteristic that cancels the gain-versus-wavelength characteristic obtained when the WDM signal light at 40 wavelengths similar to that shown in FIG. 20(b). In the result, the gain-versus-wavelength characteristic obtained when signal light at 40 wavelengths is inputted is flat, but gain deviation occurs in other wavelength arrangements such as the four kinds of WDM signal lights at six wavelengths A through D, as a result, as shown in FIG. 21(c), for example.

The permissible degree of such gain deviation in communications becomes more severe because of a recent increase in transmission distance and an increase in number of spans. Accordingly, there is a demand to introduce a function of flattening the gain deviation due to SHB into optical amplifiers applied to wavelength-division multiplex optical transmission systems.

SUMMARY OF THE INVENTION

In the light of the above problems, an object of the present invention is to reduce gain deviation due to wavelength arrangement.

(1) Therefore, the present invention provides an optical amplifier comprising a first-stage optical amplifying unit adapted to amplify inputted signal light, an optical attenuator adapted to attenuate signal light from the first-stage optical amplifying unit, a second-stage optical amplifying unit adapted to amplify signal light from the optical attenuator, an automatic gain controller adapted to control the first-stage optical amplifying unit and the second-stage optical amplifying unit so that a gain of signal light outputted from the second-stage optical amplifying unit to the signal light inputted to the first-stage optical amplifying unit is constant, and an attenuation amount controller adapted to control an attenuation amount at the optical attenuator on the basis of information on wavelength arrangement and an input level of the signal light inputted to the first-stage optical amplifying unit to adjust a gain-versus-wavelength characteristic at the first-stage and second-stage optical amplifying units automatic-gain-controlled so that a gain slope characteristic at the first-stage and second-stage optical amplifying units due to the wavelength arrangement and the input level is flattened.

(2) In this case, the attenuation amount controller may comprise a gain slope characteristic deriving unit inputted the information on the wavelength arrangement and the input level of the signal light inputted to the first-stage optical amplifying unit to derive the gain slope characteristic on the basis of the inputted information on the wavelength arrangement and the input level, an attenuation amount deriving unit adapted to derive the attenuation amount used to flatten the gain slope characteristic derived by the gain slope characteristic deriving unit, and an attenuation amount setting unit adapted to set the optical attenuator at the attenuation amount derived by the attenuation amount deriving unit.

(3) Alternatively, the attenuation amount controller may comprise an attenuation amount table adapted to retain mapping information on the attenuation amounts corresponding to the information on variations of the wavelength arrangement and the input level of the signal light inputted to the first-stage optical amplifying unit, an attenuation amount information extracting unit adapted to input the information on the wavelength arrangement and the input level of the signal light inputted to the first-stage optical amplifying unit, and to extract information on the attenuation amount corresponding to the inputted information by referring to the attenuation amount table, and an attenuation amount setting unit adapted to set the optical attenuator at the attenuation amount extracted by the attenuation amount information extracting unit.

(4) It is preferable that the automatic gain controller performs a control to keep a gain characteristic of the first-stage optical amplifying unit constant, while performing a control to keep an output level of the second-stage optical amplifying unit constant.

(5) Further, the attenuation amount controller may be inputted the information on the wavelength arrangement and the input level of the signal light inputted to the first-stage optical amplifying unit over an OSC (Optical Supervisor Channel).

(6) Still further, the optical amplifier may further comprise an information generator adapted to generate the information on the wavelength arrangement and the input level of the signal light inputted to the first-stage optical amplifying unit through the use of monitors of the inputted signal light, wherein the information on the wavelength arrangement and the input level generated by the information generator is outputted to the attenuation amount controller.

(7) The first-stage optical amplifying unit may comprise a first-stage rare-earth-doped optical fiber and a first-stage pumping unit for pumping the first-stage rare-earth-doped optical fiber, and the second-stage optical amplifying unit may comprise a second-stage rare-earth-doped optical fiber and a second-stage pumping unit for pumping the second-stage rare-earth-doped optical fiber, and the automatic gain controller may control pumping of the first-stage pumping unit and/or the second-stage pumping unit to keep the gain of the signal light outputted from the second-stage optical amplifying unit to the signal light inputted to the first-stage optical amplifying unit constant.

(8) Another optical amplifying unit may be interposed between the first-stage optical amplifying unit and the optical attenuator, or between the optical attenuator and the second-stage optical amplifying unit.

(9) Another optical attenuator may be interposed between the first-stage optical amplifying unit and the optical attenuator, or between the optical attenuator and the second-stage optical amplifying unit, or in a rear stage of the second-stage optical amplifying unit.

(10) The optical amplifier may further comprise a gain equalizer adapted to equalize the gain of the signal light outputted from the first-stage optical amplifying unit or the second-stage optical amplifying unit with an equalizing characteristic that flattens a gain-versus-wavelength on the condition that components of the gain slope characteristic of the signal light outputted from the second-stage optical amplifying unit are eliminated, wherein the attenuation amount controller controls the attenuation amount at the optical attenuator to adjust the gain-versus-wavelength characteristic at the first-stage and second-stage optical amplifying units automatic-gain-controlled with an aid of a gain equalizing function of the gain equalizer so that the gain slope characteristic at the first-stage and second-stage optical amplifying units is flattened.

(11) the attenuation amount controller may calculate a reference attenuation amount such that signal light outputted from the second-stage optical amplifying unit reaches a target level on the basis of the input level of the signal light inputted to the first-stage optical amplifying unit on the condition that components of the gain slope characteristic are eliminated, and calculate another attenuation amount used to flatten the gain slope characteristic at the first-stage and second-stage optical amplifying units due to the wavelength arrangement and the input level as a compensation attenuation amount for the reference attenuation amount, and control the optical attenuator so that the attenuation amount at the optical attenuator is a sum of the compensation attenuation amount and the reference attenuation amount.

(12) In the constitution in the above (2), the attenuation amount setting unit may calculate a reference attenuation amount such that signal light outputted from the second-stage optical amplifying unit reaches a target level on the basis of the input level of the signal light inputted to the first-stage optical amplifying unit on the condition that components of the gain slope characteristic are eliminated, the attenuation amount deriving unit may calculate another attenuation amount used to flatten the gain slope characteristic derived by the gain slope characteristic deriving unit as a compensation attenuation amount for the reference attenuation amount, and the attenuation amount setting unit may set an attenuation amount of the optical attenuator at an amount obtained by adding the compensation attenuation amount to the reference attenuation amount.

(13) In the constitution in the above (3), the attenuation amount setting unit may calculate a reference attenuation amount such that signal light outputted from the second-stage optical amplifying unit reaches a target level on the basis of the input level of the signal light inputted to the first-stage optical amplifying unit on the condition that components of the gain slope characteristic are eliminated, the attenuation amount information extracting unit may extract information on another attenuation amount used to flatten the gain slope characteristic corresponding to the inputted information as information on a compensation attenuation amount for the reference attenuation amount by referring to the attenuation amount table, and the attenuation amount setting unit may set the optical attenuator at an attenuation amount obtained by adding the compensation attenuation amount to the reference attenuation amount.

(14) The present invention further provides a method of controlling an optical amplifier comprising a first-stage optical amplifying unit for amplifying inputted signal light, an optical attenuator for attenuating signal light from the first-stage optical amplifying unit and a second-stage optical amplifying unit for amplifying signal light from the optical attenuator, the method comprising the steps of controlling the first-stage and second-stage optical amplifying units so as to keep a gain of signal light outputted from the second-stage optical amplifying unit to the signal light inputted to the first-stage optical amplifying unit constant, and inputting information on wavelength arrangement and an input level of the signal light inputted to the first-stage optical amplifying unit, and controlling an attenuation amount at the optical attenuator to adjust a gain-versus-wavelength characteristic at the first-stage and second-stage optical amplifying units automatic-gain-controlled so that a gain slope characteristic at the first-stage and second-stage optical amplifying units due to the wavelength arrangement and the input level is flattened.

According to the present invention, it is advantageously possible to reduce gain deviation due to wavelength arrangement to a sufficiently small value by setting an attenuation amount at the attenuator by the attenuation amount controller.

DESCRIPTION OF THE PREFERRED EMBODIMENTS

Now, preferred embodiments of the present invention will be described in more detail below referring to the accompanying drawings.

Note that the present invention is not limited to embodiments described hereinafter. Another object, means for attaining the object and effects other than the above object of the present invention will be apparent from the description of the embodiments.

[A] Description of First Embodiment

[A1] Configuration

Figure 1:
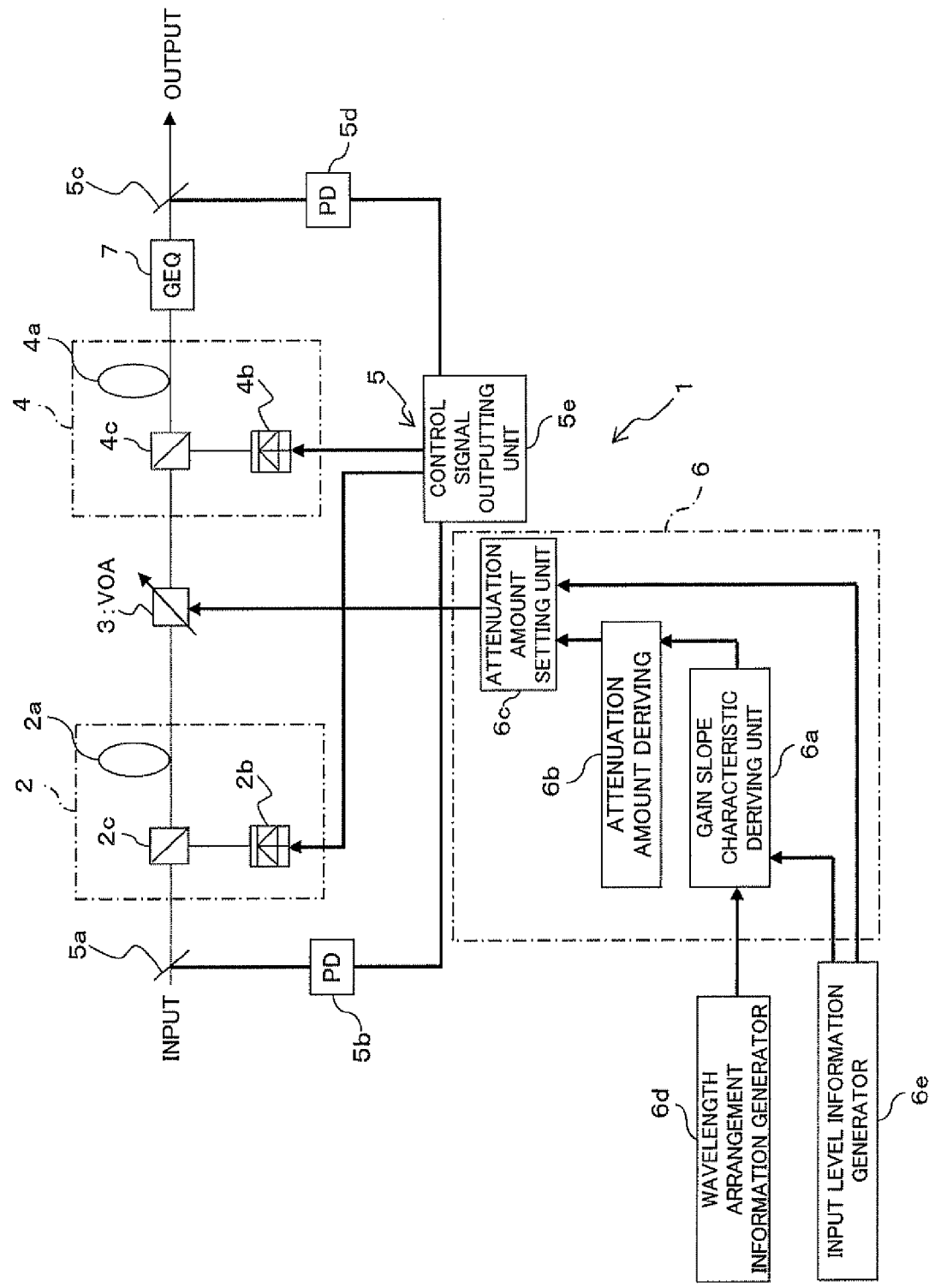
FIG. 1 is a diagram showing an optical amplifier according to a first embodiment of this invention.

FIG. 1 is a diagram showing an optical amplifier 1 according to a first embodiment of this invention. The optical amplifier 1 shown in FIG. 1 is interposed in a repeating stage in a WDM optical transmission system, for example, and can amplify WDM signal light inputted from a transmission apparatus not shown in the upstream by using a flattened gain-versus-wavelength characteristic irrespective of the wavelength arrangement of the WDM signal light, and output the signal light to a transmission apparatus in the downstream. The optical amplifier 1 comprises a first-stage optical amplifying unit 2, a variable optical attenuator 3, a second-stage optical amplifying unit 4, an automatic gain controller 5, an attenuation amount controller 6 and a GEQ 7.

The first embodiment will be described by way of example where the optical amplifier 1 is applied to a WDM optical transmission system to which 40 channels are given, for the sake of convenience. However, this invention does not limit the number of channels that are given to the applied WDM optical transmission system.

The first-stage optical amplifying unit 2 amplifies inputted WDM signal light. In the first embodiment, the first-stage optical amplifying unit 2 comprises an EDF 2a which is a rare-earth-doped optical fiber, an LD 2b which is a pumping source outputting pumping light for pumping the EDF 2a, and an optical coupler 2c for supplying the pumping light from the LD 2b along with the WDM signal light to the EDF 2a. The variable optical attenuator 3 is an attenuator for attenuating the signal light from the first-stage optical amplifying unit 2, whose attenuation amount is set and controlled by the attenuation amount controller 6 to be described later.

The second-stage optical amplifying unit 4 amplifies the WDM signal light from the variable optical attenuator 3. Like the first-stage optical amplifying unit 2, the second-stage optical amplifying unit 4 comprises an EDF 4b which is a rare-earth-doped optical fiber, an LD 4b which is a pumping source outputting pumping light used to pump the EDF 4a, and an optical coupler 4c for supplying the pumping light from the LD 4b along with the WDM signal light to the EDF 4a.

The automatic gain controller 5 monitors values of power of input signal light to be inputted to the first-stage optical amplifying unit 2 and power of output signal light outputted from the second-stage optical amplifying unit 4, and controls the first-stage and second-stage optical amplifying units 2 and 4 so that a ratio of the power of the signal light inputted to the first-stage optical amplifying unit 2 to the power of the signal light outputted from the second-stage optical amplifying unit 4, that is, a gain in the optical amplifier 1, is constant. The automatic gain controller 5 comprises branching units 5a and 5c, PDs (Photo Diodes) 5b and 5d, and a control signal outputting unit 5e.

The branching unit 5a branches the signal light from a transmission apparatus not shown in the upstream. The PD 5b detects a power pi of the signal light branched by the branching unit 5a. The branching unit 5c branches the signal light outputted from the second-stage optical amplifying unit 4 via the GEQ 7. The PD 5d detects a power po of the signal light branched by the branching unit 5c. The control signal outputting unit 5e controls pumping powers of the pumping sources 2b and 4b of the respective first-stage and second-stage optical amplifying units 2b and 4b on the basis of results of detection fed from the PDs 5b and 5d so that a gain po/pi is constant.

Figure 2:
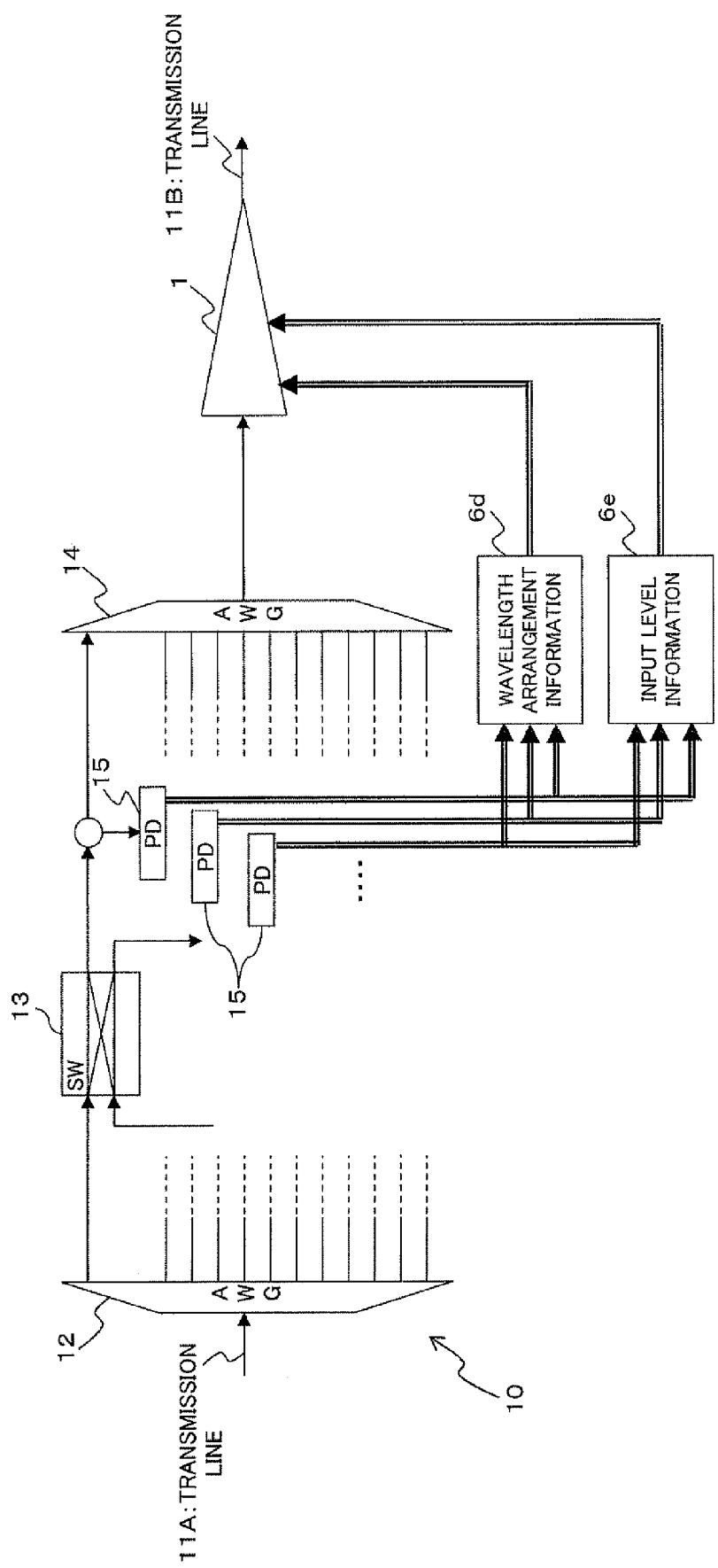
FIGS. 2 and 3 are diagrams showing examples of configuration of essential parts of an optical transmission system to which the optical amplifier according to the first embodiment is applied.
Figure 3:
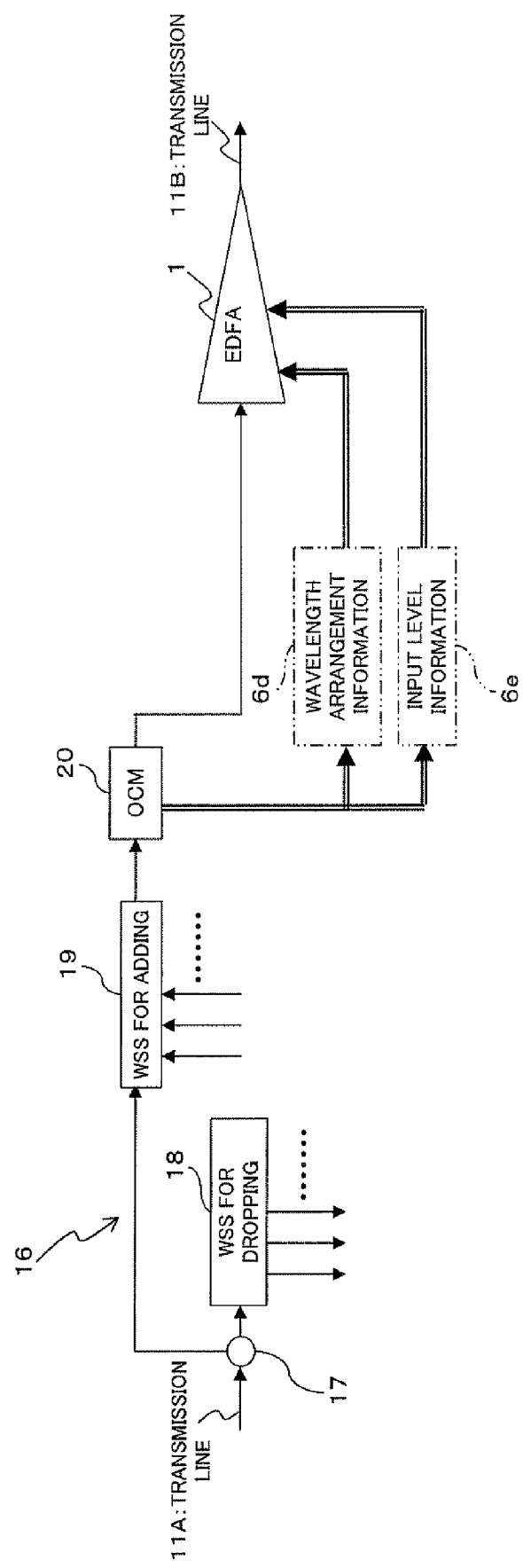

The attenuation amount controller 6 is inputted information on wavelength arrangement and information on an input level of the signal light to be inputted to the first-stage optical amplifying unit 2 from a wavelength arrangement information generator 6d and an input level information generator 6e, and controls the attenuation amount to be used at the variable optical attenuator 3 to adjust the gain-versus-wavelength characteristic at the first-stage and second-stage optical amplifying units 2 and 4 automatic-gain-controlled so that the gain slope characteristic at the first-stage and second-stage optical amplifying units 2 and 4 caused by the wavelength arrangement and the input level is flat. The information on wavelength arrangement and the information on the input level may be generated by the attenuation amount controller 6 on the basis of information fed from the outside or may be received from the outside as information, as illustrated in FIGS. 2 and 3 to be described later.

Figure 20A:
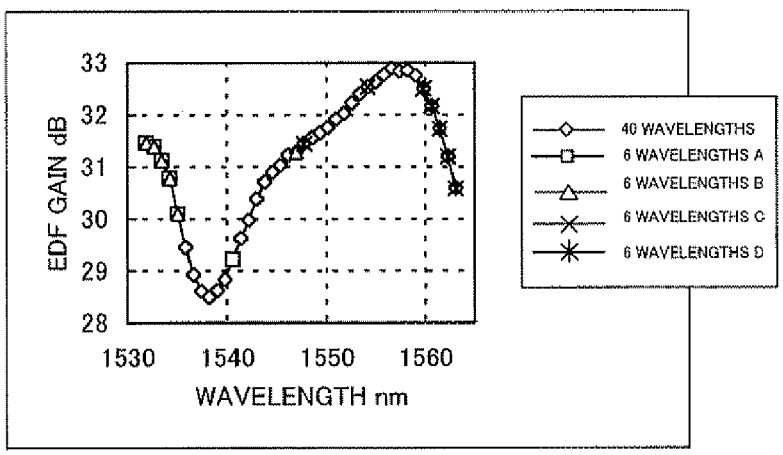
FIGS. 20(a) through 20(c) are diagrams for illustrating an operation of a known optical amplifier.
Figure 20B:
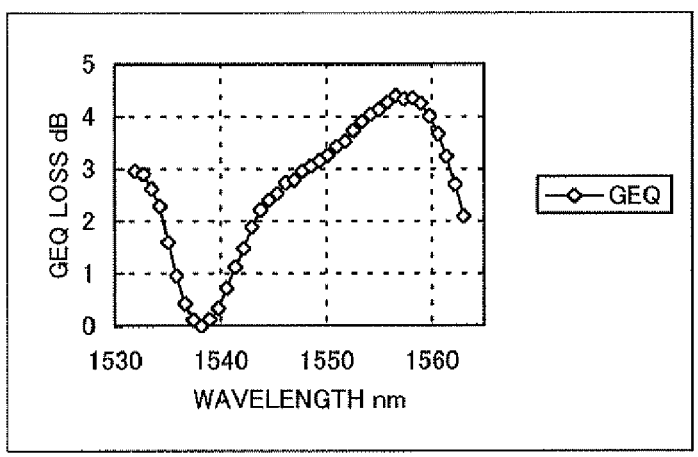
Figure 20C:
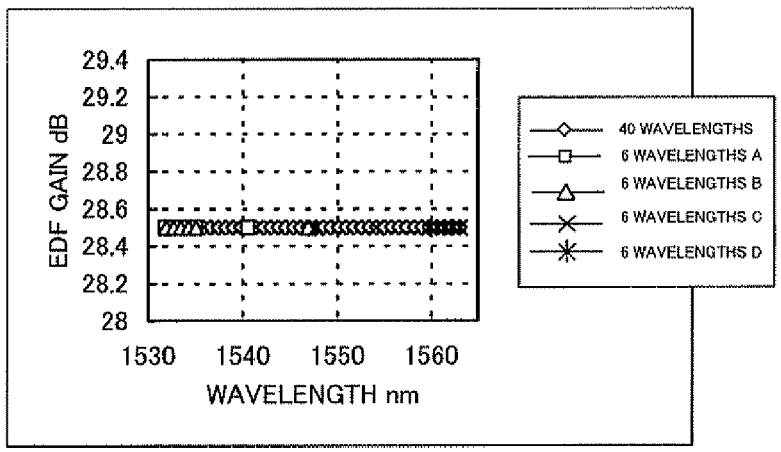

The GEQ 7 gain-equalizes the signal light from the second-stage optical amplifying unit 4 with a characteristic that flattens the gain-versus-wavelength on the condition that components of the gain slope characteristic of the signal light outputted from the second-stage optical amplifying unit 4 are eliminated. Concretely, the GEQ 7 has a gain equalization characteristic [refer to loss-versus-wavelength characteristic in FIGS. 20(*b*) and 21(*b*) that can gain-equalize the signal light from the second-stage optical amplifying unit 4 in the case where gain deviation due to SHB does not occur in the first-stage and second-stage optical amplifying units 2 and 4, such as a case where signal light at 40 wavelengths is inputted to the first-stage optical amplifying unit 2. In this embodiment, the GEQ 7 is placed on the output side of the second-stage optical amplifying unit 4. According to this invention, the GEQ 7 may be interposed between the first-stage optical amplifying unit 2 and the second-stage optical amplifying unit 4, or placed on the output sides of both the first-stage and second-stage optical amplifying units 2 and 4.

Figure 18:
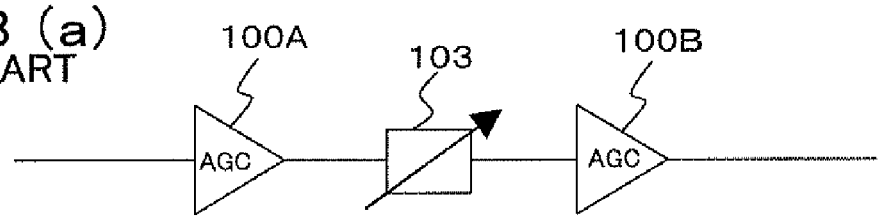
Figure 18:
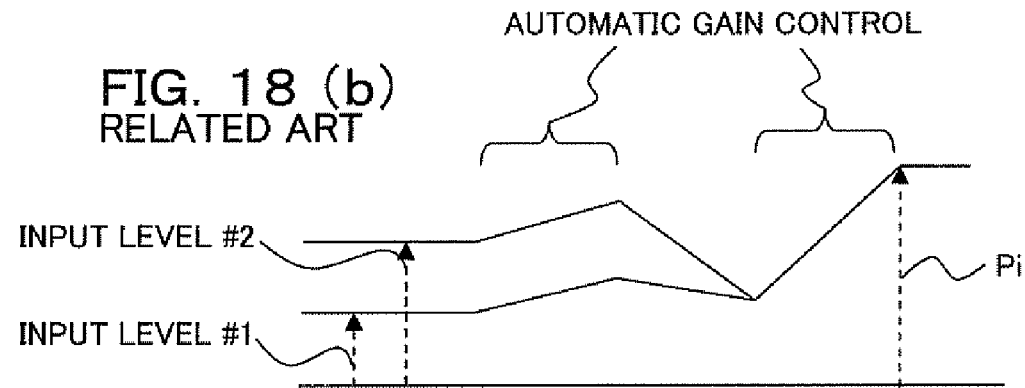
Figure 19:
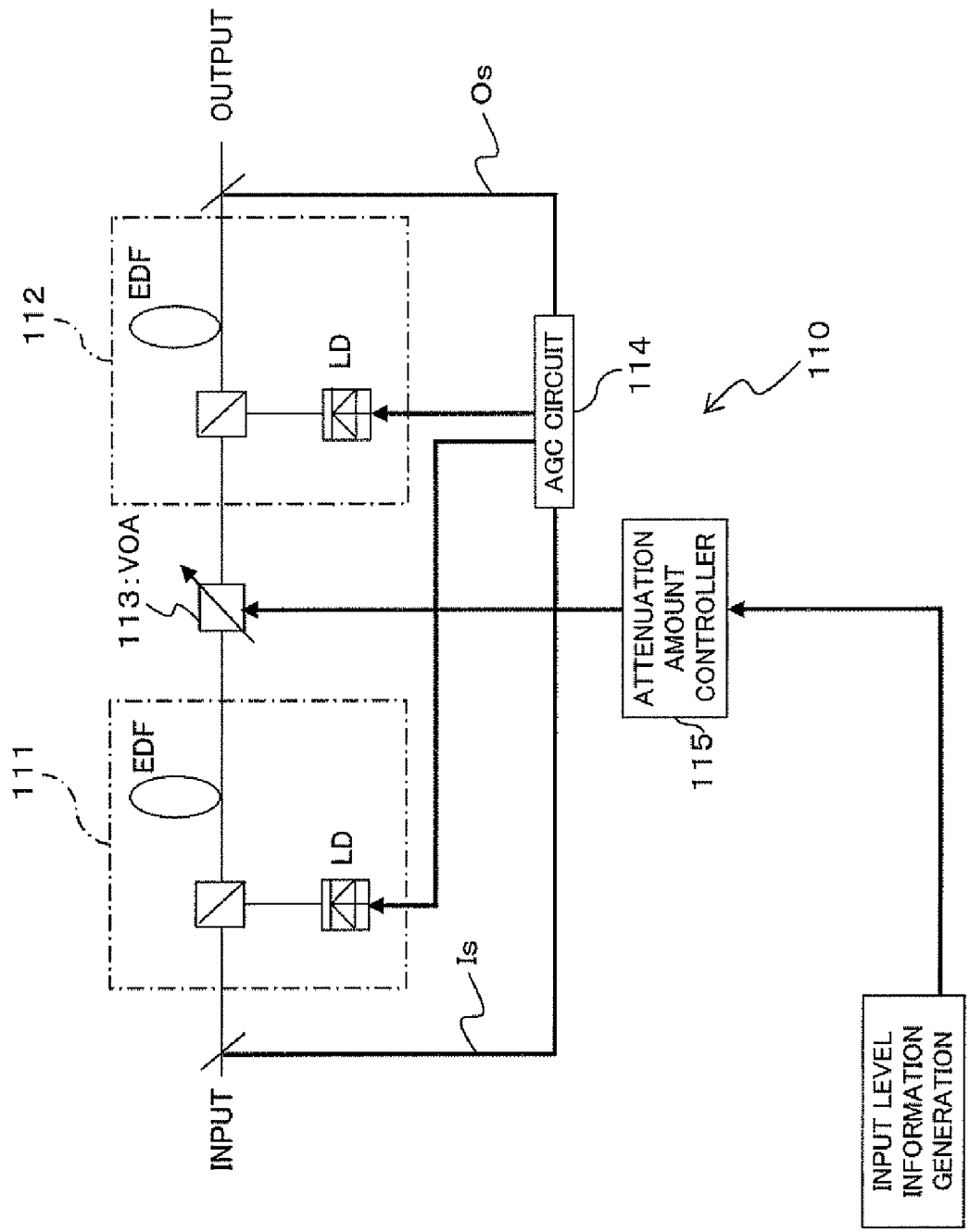
FIG. 19 is a diagram for illustrating a known optical amplifier.

When all the 40 wavelengths of the signal light are inputted to the optical amplifier 1, for example, the automatic gain controller 5 performs a gain control on the first-stage and second-stage optical amplifying units 2 and 4, and the attenuation amount controller 6 performs an attenuation control on the VOA 3 so that the gain becomes the one shown in the gain diagram in FIG. 18(*b*) described hereinbefore, whereby signal light whose gain-versus-wavelength characteristic has been flattened is outputted through the GEQ 7.

In other words, the attenuation amount controller 6 controls the attenuation amount of the VOA 3 to adjust the gain-versus-wavelength characteristic at the first-stage and second-stage optical amplifying units 2 and 4 automatic-gain-controlled so that the gain slope characteristic at the first-stage and second-stage optical amplifying units 2 and 4 is flat, with the aid of the gain equalization function of the GEQ 7 (taking in consideration an amount of gain equalization by the GEQ 7).

On the other hand, when the wavelength arrangement of the signal light inputted to the optical signal amplifier 1 is changed from the above 40 wavelengths, the attenuation amount controller 6 derives gain deviation due to SHB from this wavelength arrangement, and derives an attenuation amount at the VOA 3 that can flatten this gain deviation, and controls the VOA 3 so that the signal light is attenuated by using the obtained attenuation amount. Even when the wavelength arrangement is changed, it is possible to solve the gain deviation due to the change in wavelength arrangement, and hence output signal light whose gain-versus-wavelength characteristic has been flattened from the GEQ 7 in the following stage.

To accomplish the above function, the attenuation amount controller 6 comprises a gain slope characteristic deriving unit 6a, an attenuation amount deriving unit 6b and an attenuation amount setting unit 6c.

The gain slope characteristic deriving unit 6a is inputted information on the wavelength arrangement and information on the input level of the signal light to be inputted to the first-stage optical amplifying unit 2 from the wavelength arrangement information generator 6d and the input level information generator 6e to be described later, respectively, and derives a gain slope characteristic of the signal light to be inputted to the first-stage optical amplifying unit 2 on the basis of the information on the wavelength arrangement and the information on the input level inputted. As a mode of deriving the gain slope characteristic by the gain slope characteristic deriving unit 6a, the gain slope characteristic may be derived in a method described in forecited Non-Patent Document 1, or methods described in forecited Non-Patent Documents 2 through 7 described hereinbefore or another known method, on the basis of the information on the wavelength arrangement and the information on the input level of the signal light to be inputted to the first-stage optical amplifying unit 2.

The attenuation amount deriving unit 6b derives an attenuation amount at the VOA 3 used to flatten the gain slope characteristic derived by the gain slope characteristic deriving unit 6a. The attenuation amount setting unit 6c sets the attenuation amount at the VOA 3 according to the attenuation amount derived by the attenuation amount deriving unit 6b.

Concretely, the attenuation amount setting unit 6c calculates, on the basis of the input level of the signal light to be inputted to the first-stage optical amplifying unit 2, a standard attenuation amount which allows the signal light outputted from the second-stage optical amplifying unit 4 in the case where no gain deviation due to SHB occurs, such as a case where components of the gain slope characteristic are eliminated, that is, signal light having all the channels is inputted, to reach a target level. The attenuation amount deriving unit 6b calculates an attenuation amount at the VOA 3 to be used to flatten the gain slope characteristic derived by the gain slope characteristic deriving unit 6a as a compensation attenuation amount for the standard attenuation amount calculated by the attenuation amount setting unit 6c. Whereby, the attenuation amount setting unit 6c sets an attenuation amount obtained by adding the standard attenuation amount calculated as above to the compensation attenuation amount calculated by the attenuation amount deriving unit 6b as the attenuation amount at the VOA 3.

FIG. 2 is a diagram showing an example of configuration of essential parts of an optical transmission system to which the optical amplifier 1 according to the first embodiment is applied, including a function unit supplying the information on the wavelength arrangement and the information on the input level of the signal light to be inputted to the first-stage optical amplifying unit 2 to the gain slope characteristic deriving unit 6a of the attenuation amount controller 6. As shown in FIG. 2, the optical amplifier 1 may be placed in the rear stage of an add/drop multiplexer 10 which can add/drop individual channels of WDM signal light.

The add/drop multiplexer 10 shown in FIG. 2 comprises an AWG (Arrayed Waveguide Grating) 12 for demultiplexing the WDM signal light inputted through an input transmission line 11A into wavelength components of channels, a 2×2 switch 13 which can perform the add/drop process on the light in each of the channels demultiplexed by the AWG 12, and an AWG 14 for multiplexing rays of signal light subjected to the add/drop process by the 2×2 switch 13 and addressed to an output transmission line 11B. The optical amplifier 1 according to the first embodiment can amplify the signal light from the add/drop multiplexer 10 with a flat gain-versus-wavelength characteristic irrespective of wavelength arrangement thereof, and sent it out to the output transmission line 11B.

In the add/drop multiplexer 10, photodiodes 15 for monitoring optical powers of respective channels outputted as signal light addressed to the output transmission line 11B from the 2×2 switch 13 are provided for respective channels, and results of the monitoring by the photodiodes 15 are supplied as information on the wavelength arrangement and information on the input level to the gain slope characteristic deriving unit 6a mentioned above.

Concretely, there are provided the wavelength arrangement information generator 6d and the input level information generator 6e which collect results of monitoring fed from the photodiodes 15 provided to the respective channels, and generate the wavelength arrangement information and the input level information noted above, respectively. The information generated by the wavelength arrangement information generator 6d and the information generated by the input level information generator 6e are supplied to the gain slope characteristic deriving unit 6a.

Accordingly, the photodiodes 15, the wavelength arrangement information generator 6d and the input level information generator 6e together constitute an information generator which generates information on the wavelength arrangement and information on the input level of the signal light to be inputted to the first-stage optical amplifying unit 2 through monitoring of the signal light, and the information on the wavelength arrangement and the information on the input level generated by the wavelength information generator 6d and the input level information generator 6e constituting the information generator are outputted to the attenuation amount controller 6.

In the first embodiment, the wavelength arrangement information generator 6d and the input level information generator 6e are provided outside the optical amplifier 1. However, functions of the wavelength arrangement information generator 6d and the input level information generator 6e may be provided inside the gain slope characteristic deriving unit 6a.

FIG. 3 is a diagram showing an example of another configuration of essential parts of the optical transmission system to which the optical amplifier 1 according to the first embodiment is applied, including a function unit which supplies information on the wavelength arrangement and information on the input level of signal light to be inputted to the first-stage optical amplifying unit 1 to the gain slope characteristic deriving unit 6a of the attenuation amount controller 6. In the configuration shown in FIG. 3, the optical amplifier 1 is placed in the rear stage of an add/drop multiplexer 16 having a different configuration from the one shown in FIG. 2.

The add/drop multiplexer 16 shown in FIG. 3 comprises a branching unit 17 which branches signal light from an input transmission line 11A into two streams of light, a WSS (Wavelength Selective Switch) for dropping 18, which outputs signal light to be dropped contained in one of the streams of signal light branched by the branching unit 17, a WSS for adding 19, which multiplexes signal light on channels to be through contained in the other stream of signal light branched by the branching unit 17 onto signal light to be added, and outputs them, and an OCM (Optical Channel Monitor) 20, which monitors each channel of the signal light to be outputted to the optical amplifier 1 from the WSS for adding 19.

At this time, the OCM 20 can supply a result of monitoring of each channel of the signal light as the wavelength arrangement information and the input level information to the above-described gain slope characteristic deriving unit 6a. In this case, the wavelength arrangement information generator 6d and the input level information generator 6e similar to those described above are disposed outside the optical amplifier 1, as well. However, functions of the wavelength arrangement information generator 6d and the input level information generator 6e may be provided inside the gain slope characteristic deriving unit 6a.

[A2] Description of Gain Deviation Due to SHB

FIGS. 4 through 9 are diagrams for illustrating variations in gain characteristic at the first-stage and second-stage optical amplifying units 2 and 4 due to an effect of SHB which fluctuates according to a level and wavelength arrangement of signal light inputted to the first-stage optical amplifying unit 2.

In FIGS. 4 through 9, channels of WDM signal light inputted to the optical amplifier 1 are set within a range from 1532 to 1563 nm at intervals of 100 GHz, and the maximum number of the wavelengths is 40. The GEQ 7 is so designed that the lower limit of the input level is −25.4 dBm/ch and the upper limit of the same is −15.4 dBm/ch, and the gain deviation of 40 wavelengths is completely flat at an output (target output optical level) of 1.1 dBm. Particularly, consideration is made on a case where signal light at an input level of −20.4 dBm/ch is inputted.

The automatic gain controller 5 monitors input and output powers of the optical amplifier 1, that is, a level of signal light inputted to the first-stage optical amplifying unit 2 and a level of signal light outputted from the second-stage optical amplifying unit 4, and controls powers of the pumping sources 2b and 4b of the optical amplifying units 2 and 4 so that the gain is constant, thereby performing the automatic gain control.

In the case where the VOA 3 is fixedly given a standard attenuation amount calculated by the attenuation amount setting unit 6c of the attenuation amount controller 6, owing to which the signal light outputted from the second-stage optical amplifying unit 4 can reach a target level when no gain deviation due to SHB occurs, when the level and wavelength arrangement of the signal light inputted to the first-stage optical amplifying unit 2 are varied, gain deviation occurs as shown in FIGS. 4 through 9 due to occurring SHB in the first and second-stage optical amplifying units 2 and 4.

Figure 4:
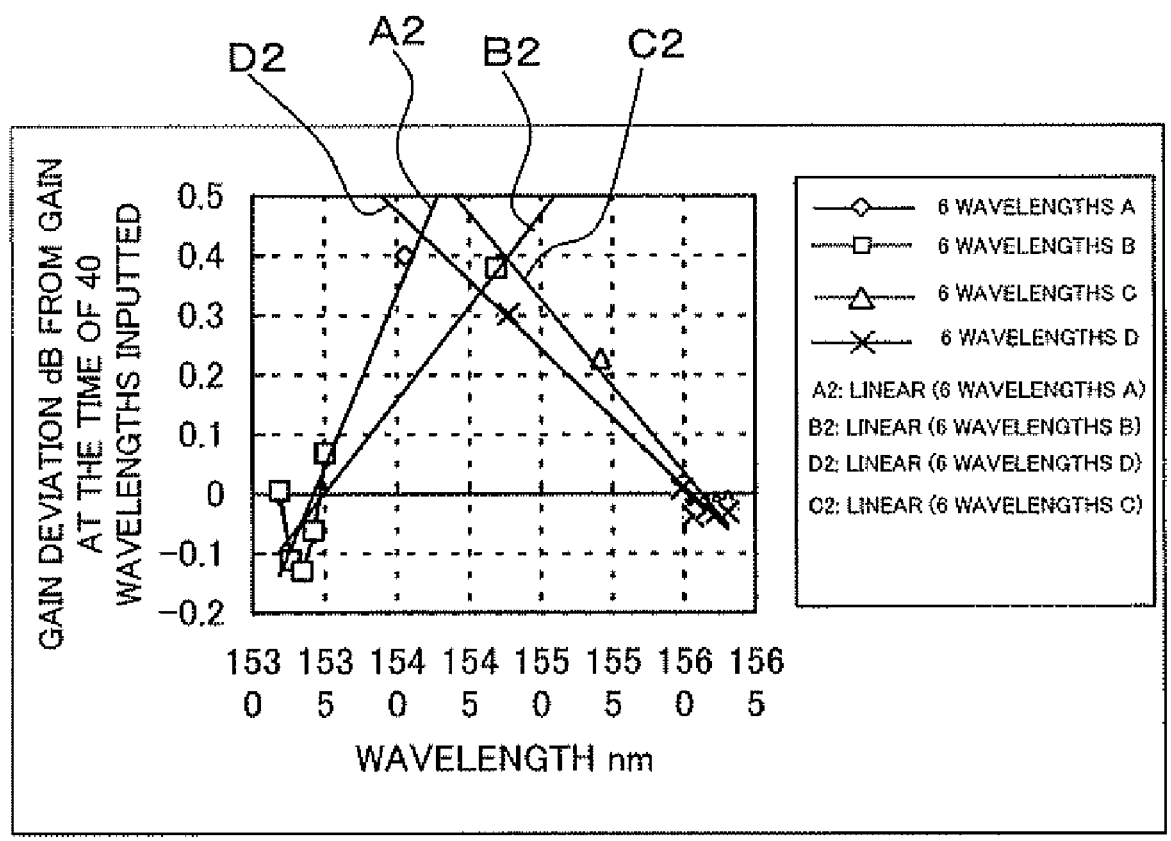
FIGS. 4 through 9 are diagrams for illustrating variation in gain characteristic at a first-stage optical amplifying unit and a second-stage optical amplifying units due to an effect of SHB.
Figure 5:
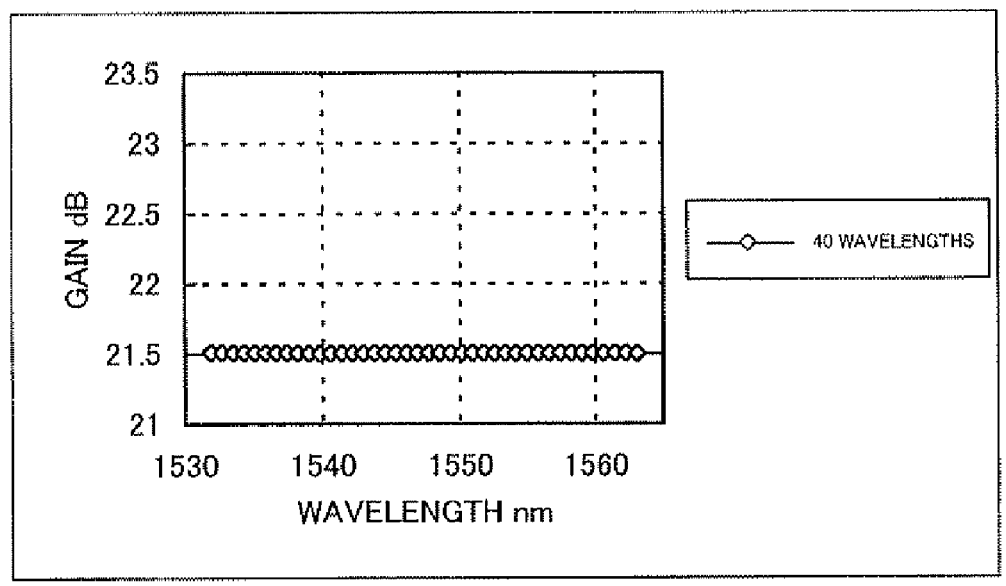

Namely, when signal light in wavelength arrangement of 40 wavelengths corresponding to all the channels is inputted, the gain deviation is flattened by the GEQ 7 as shown in FIG. 5. However, when the wavelength arrangement is changed to six wavelengths of channels #1, #2, #3, #4, #5 and #12 (hereinafter, simply referred to as wavelength arrangement A), or to six wavelengths of channels #1, #2, #3, #4, #5 and #20 (hereinafter, simply referred to as wavelength arrangement B), or to six wavelengths of channels #29, #36, #37, #38, #39 and #40 (hereinafter, simply referred to as wavelength arrangement C) or to six wavelengths of channels #21, #36, #37, #38, #39 and #40 (hereinafter, simply referred to as wavelength arrangement D) gain deviation occurs in each arranged wavelength as shown in FIG. 4, as compared with the wavelength arrangement of 40 wavelengths.

FIGS. 6 through 9 are diagrams showing the gain-versus-wavelength characteristics of the output of the GEQ 7 in the case of the wavelength arrangements A through D. It is found that the gain-versus-wavelength characteristics of the wavelength arrangements A and B are almost in a shape of primary slope that descends toward the shorter wavelengths, whereas the gain wavelength characteristics of the wavelength arrangements C and D are almost in a shape of primary slope that descends toward the longer wavelengths.

Namely, SHB is a phenomenon that when a high signal light power is inputted, gain of this signal and neighborhood thereof is decreased. When signal light at 40 wavelengths is inputted, SHB has the greatest effect on the gain thereof. The GEQ 7 can flatten the gain characteristic of output signal light when signal light at 40 wavelengths is inputted. However, a change in wavelength arrangement from the 40-wavelength arrangement means that the effect of SHB is mitigated and decreased.

Figure 6:
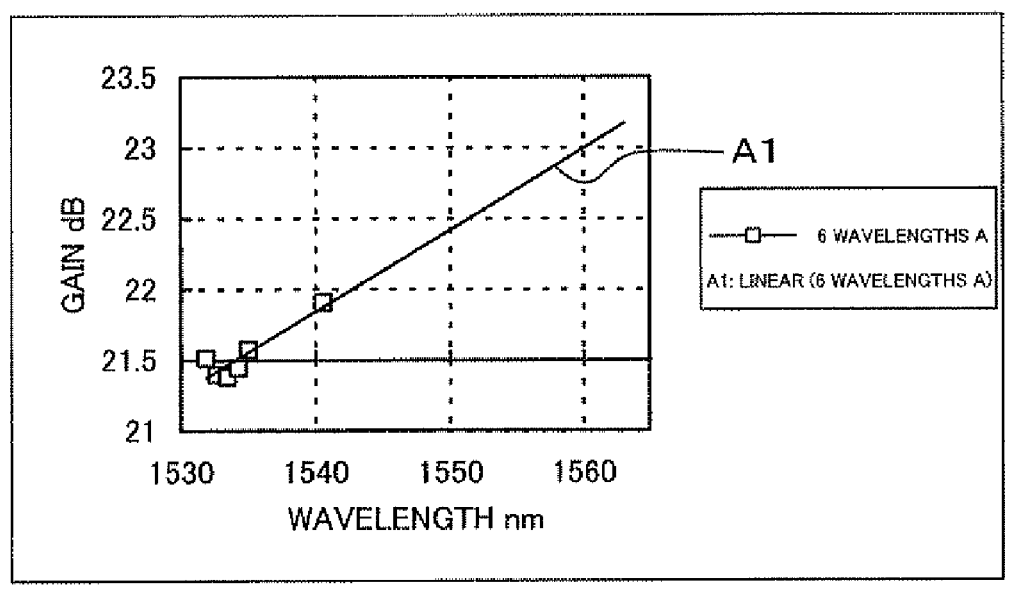
Figure 7:
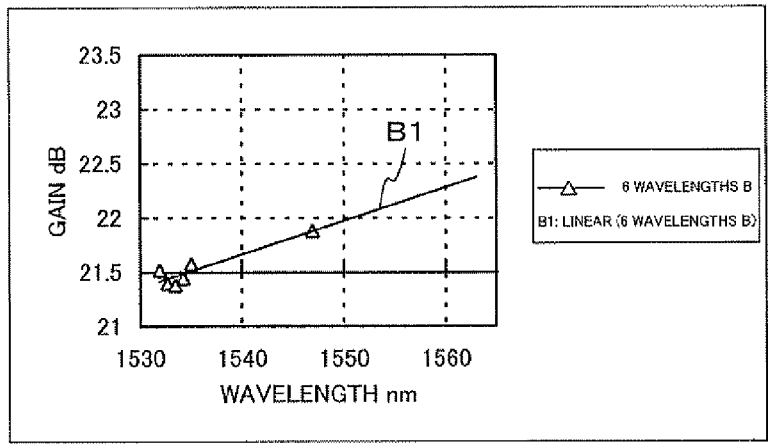

For example, when the wavelength arrangement is changed from the wavelength arrangement of 40 wavelengths to the wavelength arrangement A or B, it appears as a phenomenon that the effect of SHB on a channel (#12 in the wavelength arrangement A, or #20 in the wavelength arrangement B) arranged in a position at a wavelength isolated from a group of the other channels is mitigated and the gain is increased, as exhibited by gain-versus-wavelength characteristics in FIGS. 6 and 7, because channels outside a range of the short wavelengths are absent within the band. A1 and B1 in FIGS. 6 and 7 denote primary slope straight lines showing gain deviation in the wavelength arrangements A and B, respectively.

Figure 8:
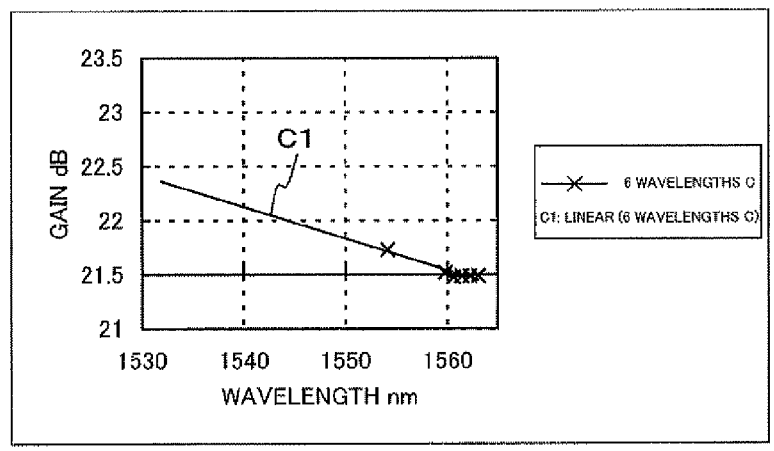
Figure 9:
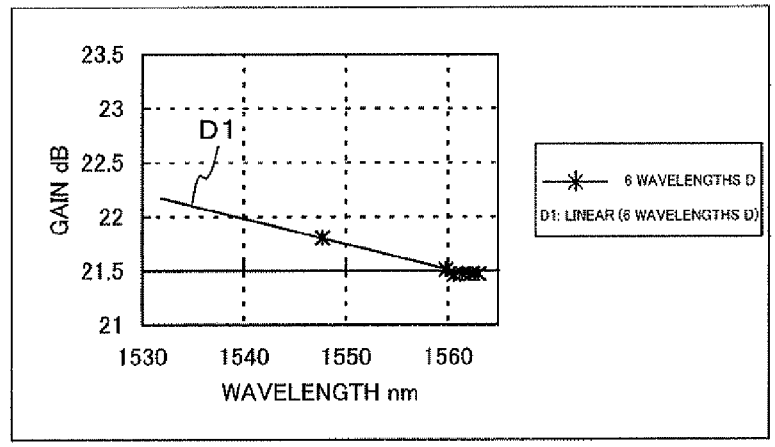

Similarly, when the wavelength arrangement is changed from the wavelength arrangement of 40 wavelengths to the wavelength arrangement C or D, it appears as a phenomenon that the effect of SHB on a channel (#29 in the wavelength arrangement C, or #21 in the wavelength arrangement D) arranged in a position at a wavelength isolated from a group of the other channels is mitigated and the gain is increased as exhibited by gain-versus-wavelength characteristics in FIGS. 8 and 9 because channels outside a range of the long wavelengths are absent within the band. C1 and D1 in FIGS. 8 and 9 denote primary slope straight lines showing gain deviation in the wavelength arrangements C and D, respectively.

It is found from the above that when the channel arrangement is biased toward the shorter wavelength's side, primary slope ascending toward the longer wavelengths (refer to A1 and B1 in FIGS. 6 and 7) generates, whereas when the channel arrangement is biased toward the longer wavelength's side, primary slope ascending toward the shorter wavelengths (refer to C1 and D1 in FIGS. 8 and 9) generates. In other words, as to the signal light outputted from the GEQ 7, when the wavelength arrangement of 40 wavelengths is considered to be a standard, the signal light outputted from the GEQ 7 comes to have deviations A2 through D2 represented by primary slopes according to the wavelength arrangements A through D, as shown in FIG. 4.

[A3] Description of a Relationship Between Gain of EDF and Primary Slope

Figure 10:
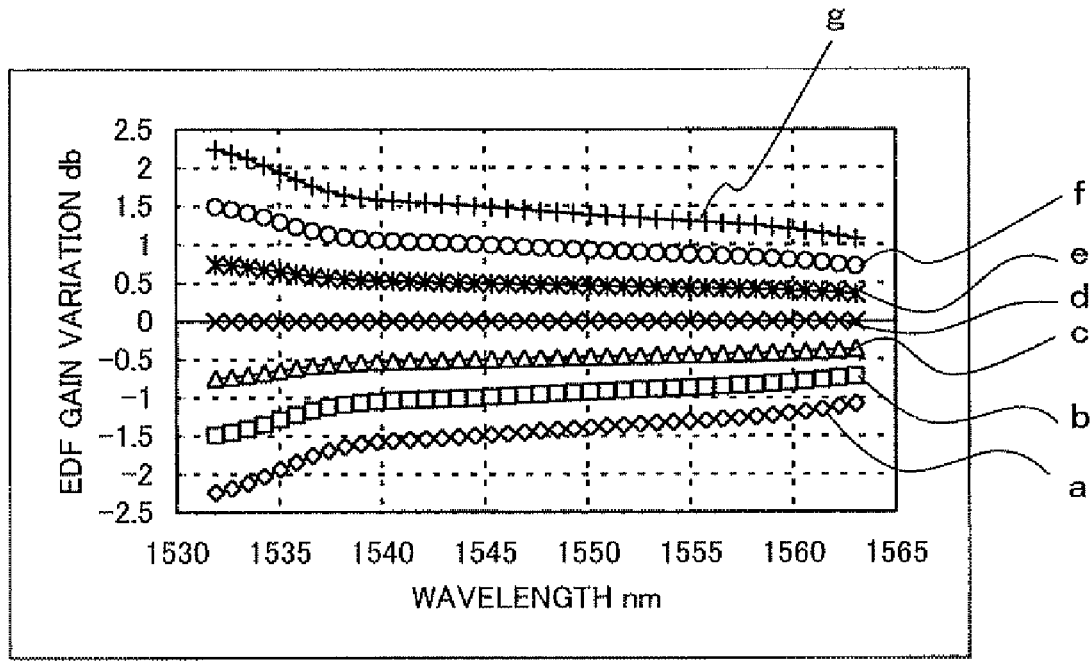
FIGS. 10 and 11 are diagrams for illustrating variation in gain slope to gain of the first-stage and second-stage optical amplifying units.
Figure 11:
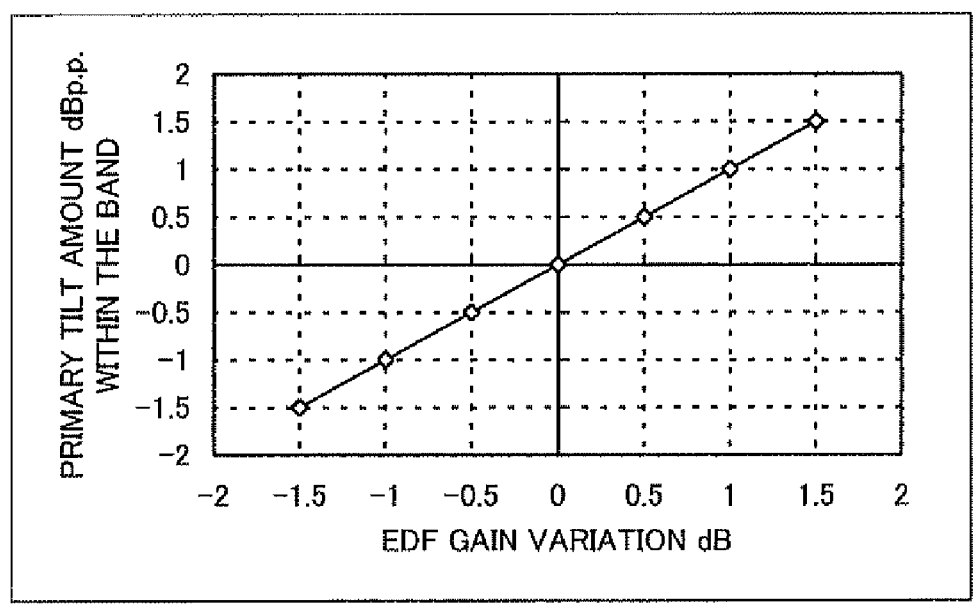

FIGS. 10 and 11 are diagrams for illustrating variations in gain slopes of gains of the first-stage and second-stage optical amplifying units 2 and 4 mentioned above. Here, discussed is an effect of variation in gain slope on variation in target gain in the automatic gain control (or variation in pumping power), avoiding an effect of SHB. Therefore, it is assumed that a standard attenuation amount calculated according to the input level by the attenuation amount setting unit 6*c* is set as the attenuation amount at the VOA 3.

When a target gain set under the automatic gain control by the automatic gain controller 5 to the first-stage and second-stage optical amplifying units 2 and 4 is assumed to be a standard gain d, a practically flat gain-versus-wavelength characteristic can be obtained owing to the gain equalizing function of the GEQ 7 in rear stage, as shown in FIG. 10.

On the other hand, when the target gain at the automatic gain controller 5 is changed from the standard gain d to, for example, a gain a, b or c (a<b<c<d), the signal light outputted from the GEQ 7 has a gain slope descending toward the shorter wavelengths, as shown in FIG. 10. When the target gain is changed to, for example, a gain e, f or g (d<e<f<g), the signal light outputted from the GEQ 7 has a gain slope descending toward the longer wavelengths, as shown in FIG. 10.

Further, when a variation amount relative to the standard gain c, which is the target gain, is changed to the above gains a to g, inclinations of the corresponding gain slopes are on an almost straight line, as shown in FIG. 11. In FIG. 11, a gain slope descending toward the shorter wavelengths has a value of a negative inclination amount (a difference in dB value), whereas a gain slope descending toward the longer wavelengths has a value of a positive inclination amount (a difference in dB value).

As above, it is possible to give a gain slope to the signal light outputted from the GEQ 7 according to a target gain of the automatic gain control performed by the automatic gain controller on the first-stage and second-stage optical amplifying units 2 and 4.

[A4] As to that Gain Deviation can be Suppressed by Adjusting the Attenuation Amount of the VOA 3

Figure 12:
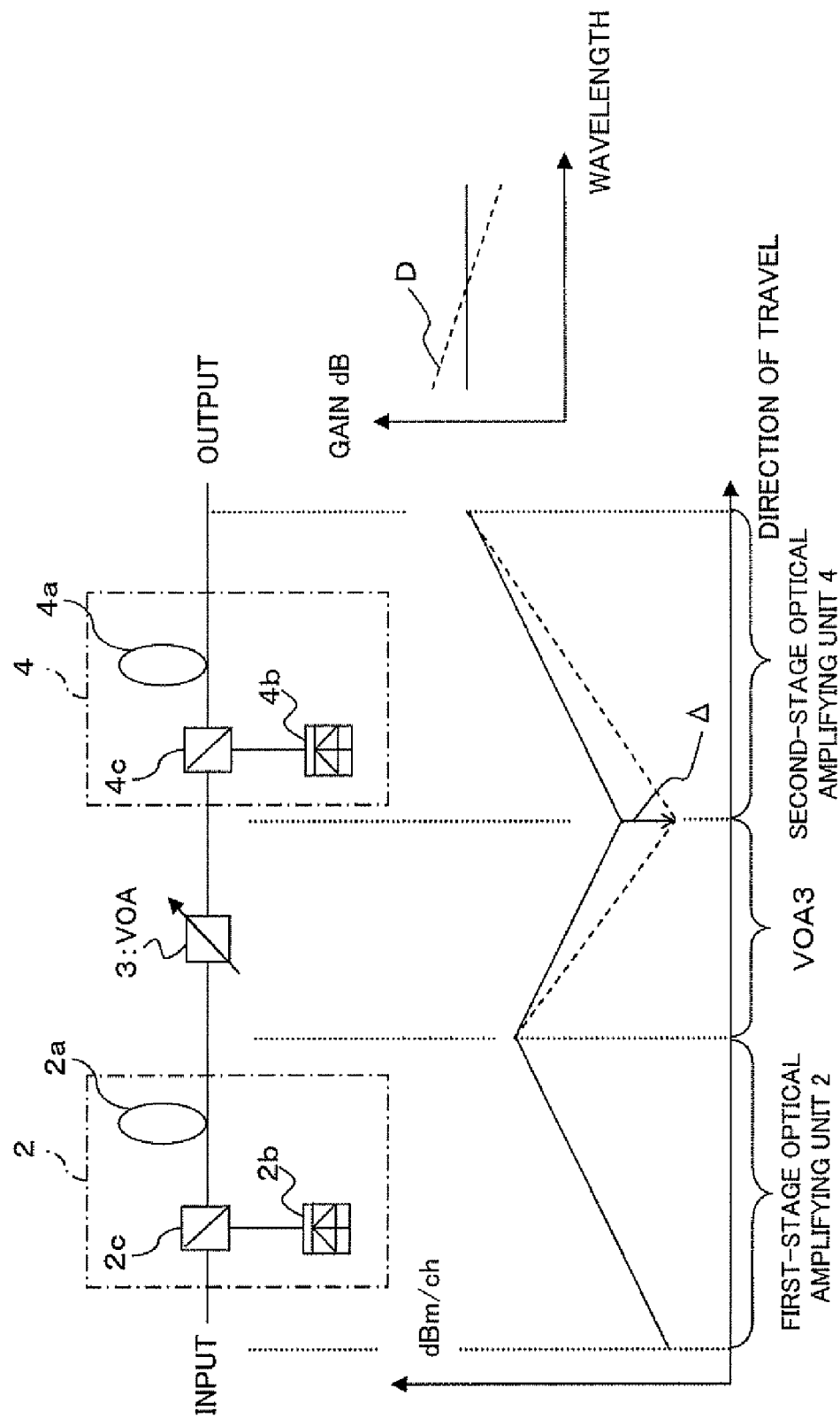
FIG. 12 is a diagram for illustrating that the gain deviation due to SHB can be suppressed by adjusting an attenuation amount at a VOA.

As discussed above in [A3], it is possible to give a gain slope to signal light outputted from the GEQ 7 by changing the target gain of the automatic gain control on the first-stage and second-stage optical amplifying units 2 and 4 by the automatic gain controller. The first embodiment utilizes this characteristic. As shown in FIG. 12, for example, when the loss of the VOA 3 is increased, a sum of gains in the first-stage and second-stage optical amplifying units 2 and 4 is increased (a change from a gain diagram indicated by a solid line to a gain diagram indicated by a broken line) under the control of the automatic gain controller 5. Whereby, it is found that a primary slope D ascending toward the shorter wavelengths can be generated in the gain deviation. To the contrary, it is possible to generate a primary slope ascending toward the longer wavelengths by decreasing the loss of the VOA 3.

Namely, by using a relationship between an amount of a change at the VOA 3 and primary slope generation, the primary slope generating due to a change in generation amount of SHB is cancelled, whereby the gain deviation is flattened. Concretely, the gain slope characteristic deriving unit 6*a* calculates a primary slope characteristic due to a change in generation amount of SHB, the attenuation amount deriving unit 6*b* calculates such an attenuation amount at the VOA 3 as to cancel the primary slope characteristic calculated by the gain slope characteristic deriving unit 6*a* as a compensation attenuation amount (refer to Δ in FIG. 12) for the standard attenuation amount noted above, and the attenuation amount setting unit 6*c* adds the above standard attenuation amount to the compensation attenuation amount and sets the obtained attenuation amount in the VOA 3. Whereby, the GEQ 7 can output signal light in which the gain deviation has been suppressed according to the wavelength arrangement and the input level.

When the primary slope A2, B2, C2 or D2 is generated in the gain deviation according to the wavelength arrangement A, B, C or D as shown in FIG. 4 above, 2.3 dB for the wavelength arrangement A, 1.2 dB for the wavelength arrangement B, −1.1 dB for the wavelength arrangement C, or −0.9 dB for the wavelength arrangement D, for example, can be obtained as the compensation attenuation amount derived by the attenuation amount deriving unit 6*b*. When it is so designed that the lower limit of the input level is −25.4 dBm/ch and the standard attenuation amount of the VOA 3 is 1 dB, it is necessary to set the standard attenuation amount to 6 dB if the input level is −20.4 dBm/ch. Accordingly, a value obtained by adding 6 dB, which is the standard attenuation amount, to a compensation attenuation value according to the wavelength arrangement A, B, C or D (and an input level of −20.4 dBm/ch) is finally set as the attenuation value to be set at the VOA 3.

Figure 13:
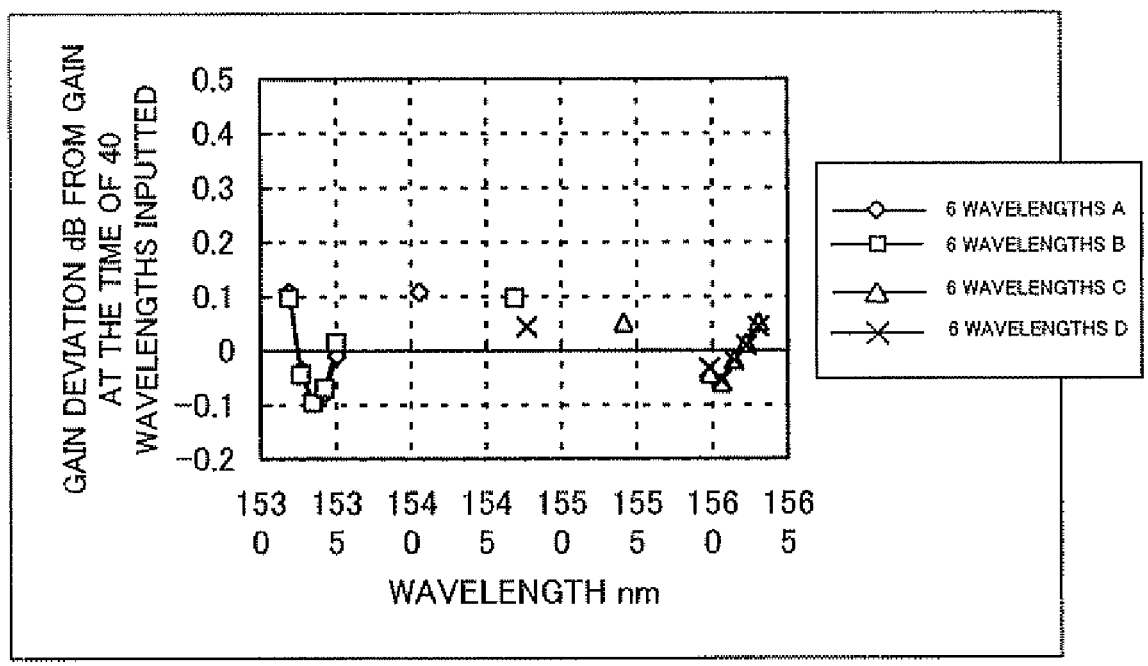
FIG. 13 is a diagram for illustrating an effect of the first embodiment.
Figure 21A:
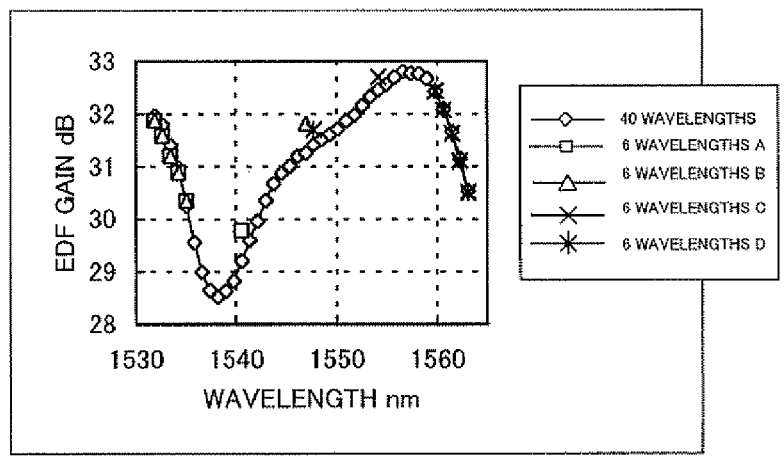
FIGS. 21(a) through 21(c) are diagrams for illustrating an object to be attained by the present invention.
Figure 21B:
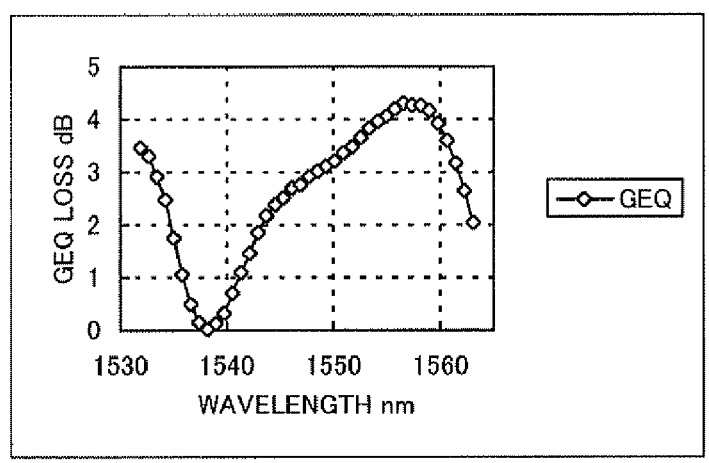
Figure 21C:
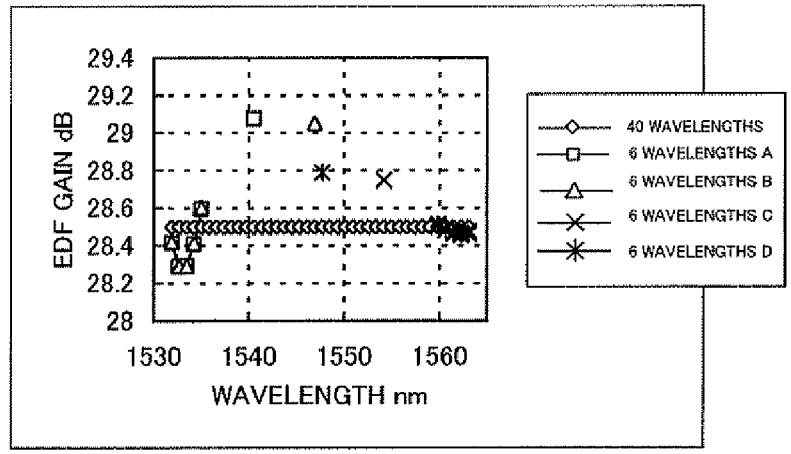

Namely, the attenuation amount setting unit 6c sets an attenuation amount, which is obtained by adding a compensation attenuation amount calculated by the attenuation amount deriving unit 6b as above to the standard attenuation amount, to the VOA 3, whereby the gain deviation of signal light outputted from the GEQ 7 can be more suppressed, as shown in FIG. 13, as compared with the above-described case shown in FIG. 21(c). It is found from results of simulation (refer to FIG. 13) that the gain deviation generated according to the wavelength arrangement can be reduced to approximately 30 to 40% of the known technique [refer to FIG. 21(c)].

[A5] Effects

In the optical amplifier 1 configured as above according to the first embodiment, inputted signal light is amplified by the first-stage and second-stage optical amplifying units 2 and 4 whose gain is so controlled that the level ratio of input to output is constant, and attenuated by the VOA 3 interposed between the first-stage and second-stage optical amplifying units 2 and 4 by an attenuation amount set by the attenuation amount controller 6, whereby the signal light whose gain-versus-wavelength characteristic has been flattened can be outputted, while gain deviation generated due to the wavelength arrangement can be suppressed through gain equalization by the GEQ 7.

At this time, the attenuation amount setting unit 6 obtains wavelength arrangement information and input level information on the signal light to be inputted to the first-stage optical amplifying unit 2 as information from the outside. On the basis of these two pieces of information, the gain slope characteristic deriving unit 6a calculates gain deviation due to a change in amount of generation of SHE.

This gain deviation generates in a form similar to the primary slope, as shown in FIGS. 4 through 9 described hereinbefore. On the other hand, a relationship between the gain of the first-stage and second-stage optical amplifying units 2 and 4, and the gain slope can be practically expressed as the primary slope as shown in FIGS. 10 and 11. Hence, it is found that, by utilizing this characteristic, the attenuation amount controller 6 increases the loss at the VOA 3 as shown in FIG. 12, whereby a sum of the gains at the first-stage and second-stage optical amplifying units 2 and 4 increases, which allows to generate a primary slope ascending toward the shorter wavelengths in the gain deviation.

Concretely, the gain slope characteristic deriving unit 6a derives a primary slope due to a change in generation amount of SHB, and the attenuation amount deriving unit 6b calculates such a change amount (compensation attenuation amount) at VOA 3 as to cancel the deviation by using a relationship of generated primary slope of gain at the first-stage and second-stage optical amplifying units 2 and 4 obtained from the change amount at the VOA 3, and flatten the gain deviation. The attenuation amount setting unit 6c adds the standard attenuation amount to the calculated compensation attenuation amount, thereby determining a final attenuation amount at the VOA 3.

The first embodiment of this invention has an advantage that gain deviation generated due to wavelength arrangement can be reduced to a sufficient small value by setting an attenuation amount at the VOA 3 by the attenuation amount controller 6.

[B] Description of Second Embodiment

Figure 14:
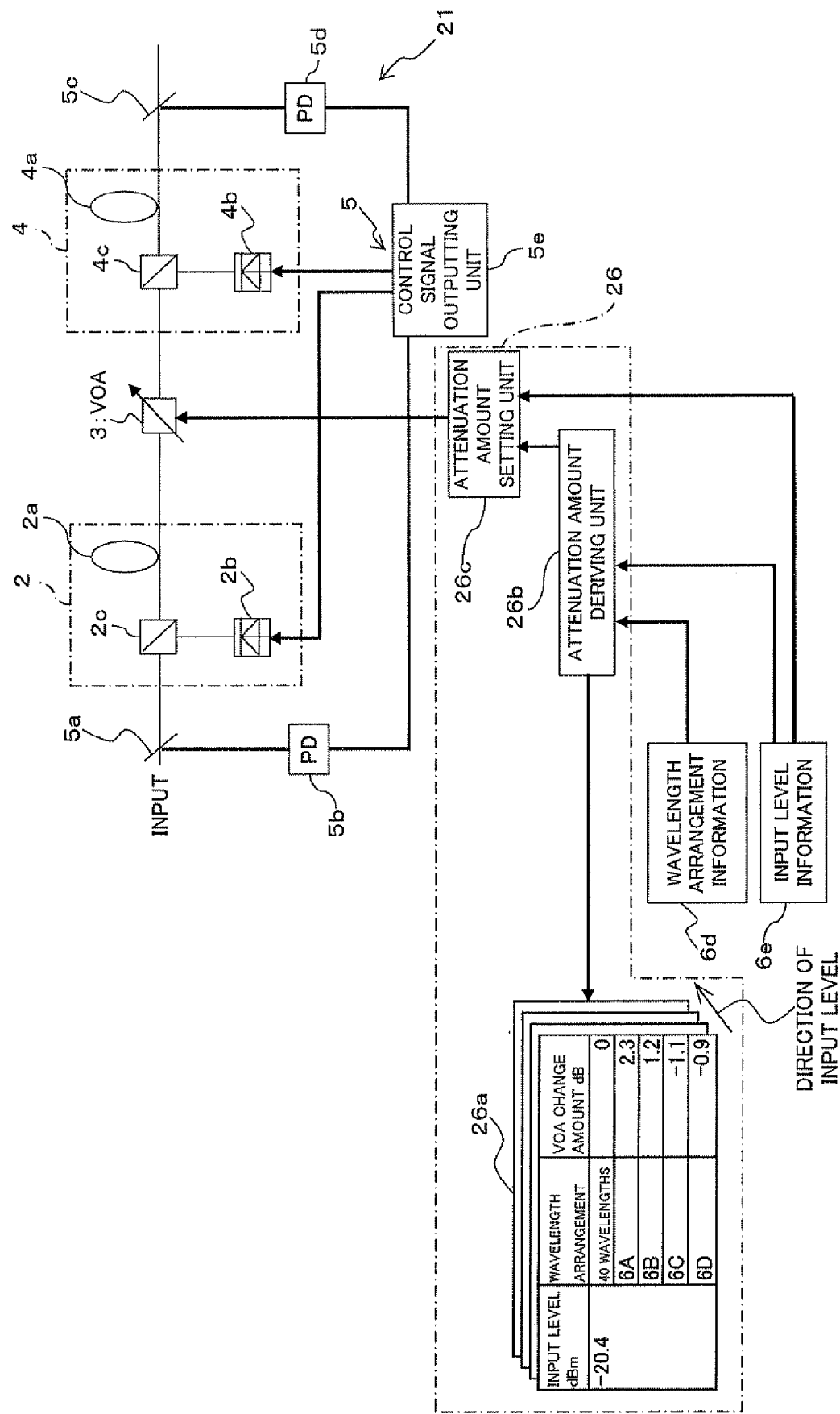
FIG. 14 is a diagram showing an optical amplifier according to a second embodiment of this invention.
Figure 15A:
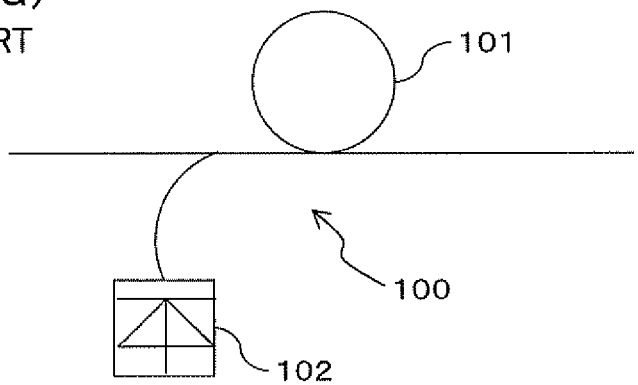
FIGS. 15(a), 15(b), 16(a), 16(b), 17(a), 17(b), 18(a) and 18(b) are diagrams for illustrating known optical amplifiers.
Figure 15B:
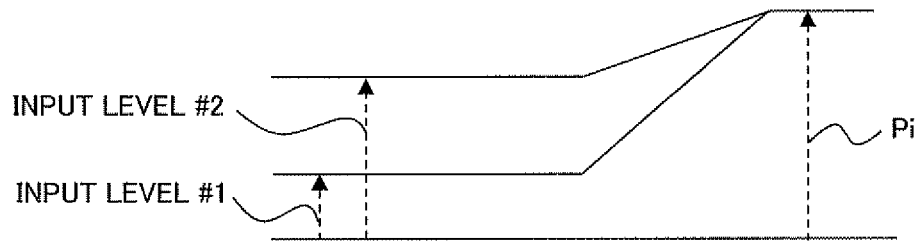
Figure 16A:
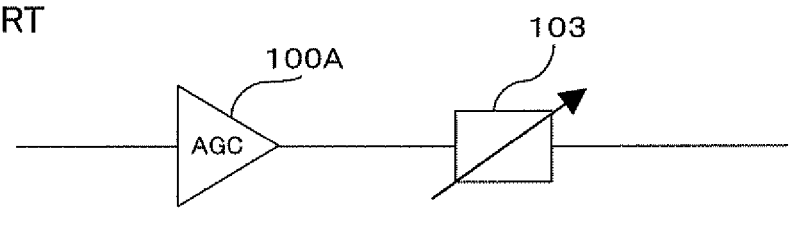
Figure 16B:
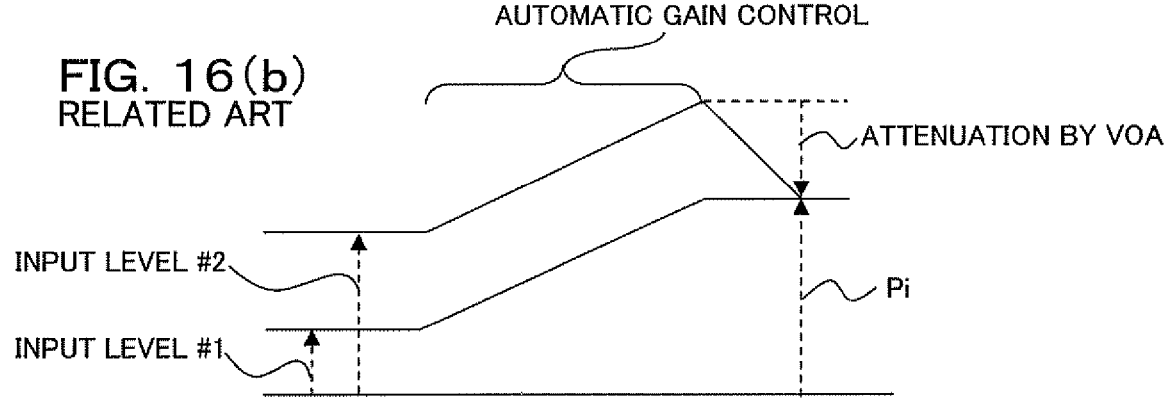
Figure 17:
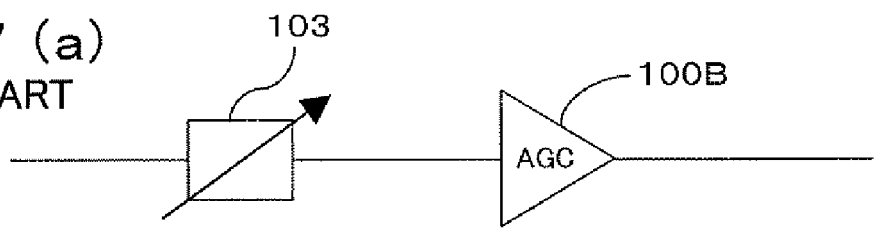
Figure 17:
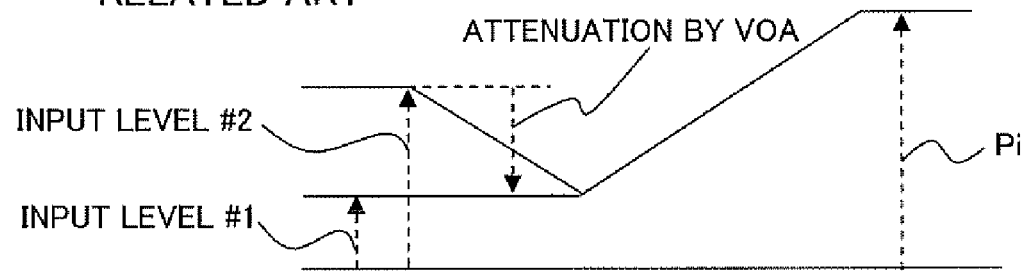

FIG. 14 is a diagram showing an optical amplifier 21 according to a second embodiment of this invention. The optical amplifier 21 shown in FIG. 14 has an attenuation amount controller 26 whose configuration differs from that of the optical amplifier 1 according to the above-described first embodiment, other elements of which are basically similar to those of the optical amplifier 1 according to the first embodiment. In FIG. 14, like reference characters designate like or corresponding parts in FIG. 1.

The attenuation amount controller 26 of the optical amplifier 21 according to the second embodiment comprises an attenuation amount table 26a, an attenuation amount information extracting unit 26b and an attenuation amount setting unit 26c. The attenuation amount table 26a retains information about an attenuation amount (compensation attenuation amount in this case) at the VOA 3 used to flatten the gain slope characteristic, in which the attenuation amount is correlated with information on wavelength arrangement and information on an input level of signal light to be inputted to the first-stage optical amplifying unit 2. Concretely, as shown in FIG. 14, in the attenuation amount table 26a, a page is made for each input level (of each channel) of signal light to be inputted to the first-stage optical amplifying unit 2, and a compensation attenuation amount at the VOA 3 according to each wavelength arrangement pattern is correlated with each level and stored. A plural number of pages may be set in the attenuation amount table 26a, at predetermined input level intervals within a range of the permissible input level of the optical amplifier 21.

The attenuation amount information extracting unit 26b is inputted the information on wavelength arrangement and the information on an input level of the signal light to be inputted to the first-stage optical amplifying unit 2 from the wavelength arrangement information generator 6d and the input level information generator 6e to extract attenuation amount information corresponding to inputted these pieces of information (wavelength arrangement information and input level information) by referring to the attenuation amount table 26a.

The attenuation amount setting unit 26c calculates a standard attenuation amount which allows signal light outputted from the second-stage optical amplifying unit 4 in the case where no gain deviation due to SHB occurs to reach a target level, adds the compensation attenuation amount extracted by the attenuation amount information extracting unit 26b to the above standard attenuation amount, and sets an attenuation amount resulting from this adding in the VOA 3, like the attenuation amount setting unit 6c in the first embodiment.

In the optical amplifier 21 according to the second embodiment, gain deviation due to SHB is beforehand calculated by using wavelength arrangement and input levels which can be of a signal light input as parameters, and the calculated gain deviation can be stored in the attenuation amount table 26a. Therefore, the second embodiment can provide, in addition to the advantages provided by the first embodiment, an advantage that retrieval in the table by the attenuation amount information extracting unit 26b can dispense with once more calculation of a gain slope due to SHB when the signal light is inputted, which can shorten a time period required to set an attenuation amount in the VOA 3 than the first embodiment.

In the second embodiment, compensation attenuation amounts for compensating gain deviation due to SHB are stored in the attenuation amount table 26a. However, this invention is not limited to this example. A value obtained by adding a standard attenuation amount to a compensation attenuation amount may be correlated with wavelength arrangement at each input level, and stored. If doing so, it becomes possible to directly extract a value obtained by adding a standard attenuation value to a compensation attenuation amount by the attenuation amount information extracting unit 26b, that is, attenuation amount information to be set in the VOA 3. Hence it becomes unnecessary to calculate a standard attenuation amount according to an input level by the attenuation amount setting unit 26c, thereby more shortening a time period required to set an attenuation amount in the VOA 3.

[C] Others

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are intended to be embraced by the claims.

For example, no limitation is imposed on a mode of controlling each of the first-stage and second-stage optical amplifying units 2 and 4 by the automatic gain controller 5. A compensation attenuation amount may be given either the optical amplifying units 2 and 4, or distributed and given to both of the optical amplifying unit 2 and 4. The automatic gain controller 5 may separately control the first-stage and second-stage optical amplifying units 2 and 4 so long as a ratio of an input level at the first-stage optical amplifying unit 2 to an output level at the second-stage optical amplifying unit 4 is constant. For example, the automatic gain controller 5 may perform a control so that the gain characteristic of the first-stage optical amplifying unit 2 is constant by monitoring input/output characteristic of the first-stage optical amplifying unit 2, while performing a control so that the output level of the second-stage optical amplifying unit 4 is constant.

According to this invention, another optical amplifying unit may be interposed between the first-stage optical amplifying unit 2 and the VOA 3, or between the VOA 3 and the second-stage optical amplifying unit 4 to configure an optical amplifier in which optical amplifying units in three or more stages are connected in series.

A VOA as being another optical attenuator may be interposed between the first-stage optical amplifying unit 2 and the VOA 3, or between the VOA 3 and the second-stage optical amplifying unit 4, or in the rear stage of the second-stage optical amplifying unit 4.

Further, a function as being the GEQ 7 may be built in each of the optical amplifying units 2 and 4.

Disclosure of the above embodiments enables persons skilled in the art to fabricate the apparatus of this invention.

What is claimed is:

1. An optical transmission system comprising:
an add/drop multiplexer adapted to demultiplex input signal light, drop and permit to be through the demultiplexed light, and add signal light;
a plurality of photodiodes adapted to monitor signal light at each wavelength which may be an output from said add/drop multiplexer, and output an electric signal; and
an optical amplifier provided at a rear stage of said add/drop multiplexer, said optical amplifier comprising:
a first-stage optical amplifier adapted to amplify input signal light;
an optical attenuator adapted to attenuate signal light from said first-stage optical amplifier;
a second-stage optical amplifier adapted to amplify signal light from said optical attenuator;
an automatic gain controller adapted to control said first-stage optical amplifier and said second-stage optical amplifier so that a gain of signal light output from said second-stage optical amplifier to the signal light input to said first-stage optical amplifier is constant; and
an attenuation amount controller adapted to produce a first gain slope related to a spectral hole burning (SHB) generated at said first-stage and said second-stage optical amplifiers from a wavelength arrangement and an input level obtained on the basis of an electric signal from each of said photodiodes for each wavelength of the signal light input to said first-stage optical amplifier, produce a second gain slope at said first-stage and second-stage optical amplifiers obtained from a change amount of an attenuation amount by said optical attenuator, and control the attenuation amount at said optical attenuator to adjust the second gain slope so that the first gain slope is substantially canceled.

2. The optical transmission system according to claim 1, wherein said attenuation amount controller further comprises:
a gain slope characteristic deriving unit adapted to produce the first gain slope related to the SHB generated at said first-stage and said second-stage optical amplifiers from the wavelength arrangement and the input level obtained on the basis of the electric signal from each of said photodiodes for each wavelength of the signal light input to said first-stage optical amplifier;
an attenuation amount deriving unit adapted to produce the second gain slope at said first-stage and second-stage optical amplifiers obtained from the change amount of the attenuation amount by said optical attenuator, and derive the attenuation amount at said optical attenuator to adjust the second gain slope so that the first gain slope is substantially canceled; and
an attenuation amount setter adapted to set said optical attenuator at the attenuation amount derived by said attenuation amount deriving unit.

3. The optical transmission system according to claim 1, wherein said attenuation amount controller comprises:
an attenuation amount table adapted to retain mapping information on the attenuation amounts corresponding to the variations of the wavelength arrangement and the input level obtained on the basis of the electric signal from each of said photodiodes for each wavelength of the signal light input to said first-stage optical amplifier to adjust the second gain slope so that the first gain slope is substantially canceled, on the basis of a relationship between said change amount of the attenuation amount and said produced second gain slope;
a attenuation amount information extractor adapted to extract the attenuation amount corresponding to the input information by referring to said attenuation amount table based on the wavelength arrangement and the input level obtained on the basis of the electric signal from each of said photodiodes for each wavelength of the signal light input to said first-stage optical amplifier; and
an attenuation amount setter adapted to set said optical attenuator at the attenuation amount extracted by said attenuation amount information extractor.

4. The optical transmission system according to claim 1, wherein
said automatic gain controller performs a control to keep a gain characteristic of said first-stage optical amplifier constant, while performing a control to keep an output level of said second-stage optical amplifier constant.

5. The optical transmission system according to claim 1, wherein
said attenuation amount controller is input the information on the wavelength arrangement and the input level of the signal light input to said first-stage optical amplifier over an OSC (Optical Supervisor Channel).

6. The optical transmission system according to claim 1 further comprising:
a wavelength arrangement information generator adapted to generate information on the wavelength arrangement of the signal light input to said first-stage optical amplifier through the use of monitors of the input signal light; and
an input level information generator adapted to generate information on the input level of the signal light input to said first-stage optical amplifier through the use of monitors of the input signal light; wherein
the information on the wavelength arrangement generated by said wavelength arrangement information generator and the information on the input level generated by said input level information generator is output to said attenuation amount controller.

7. The optical transmission system according to claim 1, wherein
said first-stage optical amplifier comprises a first-stage rare-earth-doped optical fiber and a first-stage pumping unit for pumping said first-stage rare-earth-doped optical fiber, and said second-stage optical amplifier comprises a second-stage rare-earth-doped optical fiber and a second-stage pumping unit for pumping said second-stage rare-earth-doped optical fiber; and
said automatic gain controller controls pumping of said first-stage pumping unit and/or said second-stage pumping unit to keep the gain of the signal light output from said second-stage optical amplifier to the signal light input to said first-stage optical amplifier constant.

8. The optical transmission system according to claim 1, wherein
another optical amplifier is interposed between said first-stage optical amplifier and said optical attenuator, or between said optical attenuator and said second-stage optical amplifier.

9. The optical transmission system according to claim 1, wherein
another optical attenuator is interposed between said first-stage optical amplifier and said optical attenuator, or between said optical attenuator and said second-stage optical amplifier, or in a rear stage of said second-stage optical amplifier.

10. The optical transmission system according to claim 1 further comprising:
a gain equalizer adapted to equalize the gain of the signal light output from said first-stage optical amplifier or said second-stage optical amplifier with an equalizing characteristic that flattens the second gain slope on the condition that components of the first gain slope of the signal light output from said second-stage optical amplifier are eliminated; wherein
said attenuation amount controller controls the attenuation amount at said optical attenuator to adjust the second gain slope at said first-stage and second-stage optical amplifiers automatic-gain-controlled with an aid of a gain equalizing function of said gain equalizer so that the first gain slope at said first-stage and second-stage optical amplifiers is substantially canceled.

11. The optical transmission system according to claim 1, wherein
said attenuation amount controller produces a reference attenuation amount such that signal light output from said second-stage optical amplifier reaches a target level on the basis of the input level of the signal light obtained on the basis of the electric signal from each of said photodiodes for each wavelength input to said first-stage optical amplifier on the condition that components of the first gain slope are eliminated, and produces another attenuation amount used to adjust the second gain slope so that the first gain slope is substantially canceled due to the wavelength arrangement and the input level as a compensation attenuation amount for the reference attenuation amount, and controls said optical attenuator so that the attenuation amount at said optical attenuator is a sum of the compensation attenuation amount and the reference attenuation amount.

12. The optical transmission system according to claim 2, wherein
said attenuation amount setter produces a reference attenuation amount such that signal light output from said second-stage optical amplifier reaches a target level on the basis of the input level obtained on the basis of the electric signal from each of said photodiodes for each wavelength of the signal light input to said first-stage optical amplifier on the condition that components of the first gain slope are eliminated,
said attenuation amount deriving unit produces another attenuation amount used to adjust the second gain slope so that the first gain slope is substantially canceled derived by said gain slope characteristic deriving unit as a compensation attenuation amount for the reference attenuation amount, and
said attenuation amount setter sets an attenuation amount of said optical attenuator at an amount obtained by adding the compensation attenuation amount to the reference attenuation amount.

13. The optical transmission system according to claim 3, wherein
said attenuation amount setter produces a reference attenuation amount such that signal light output from said second-stage optical amplifier reaches a target level on the basis of the input level obtained on the basis of the electric signal from each of said photodiodes for each wavelength of the signal light input to said first-stage optical amplifier on the condition that components of the first gain slope are eliminated;
said attenuation amount information extractor extracts information on another attenuation amount used to adjust the second gain slope so that the first gain slope is substantially canceled corresponding to the input information as information on a compensation attenuation amount for the reference attenuation amount by referring to the attenuation amount table; and
said attenuation amount setter sets said optical attenuator at an attenuation amount obtained by adding the compensation attenuation amount to the reference attenuation amount.

* * * * *